United States Patent
Roth et al.

(10) Patent No.: US 10,551,575 B2
(45) Date of Patent: Feb. 4, 2020

(54) OPTICAL COUPLER INCLUDING A FARADAY ROTATOR LAYER AND AT LEAST ONE GRATING COUPLER

(71) Applicant: Juniper Networks, Inc., Sunnyvale, CA (US)

(72) Inventors: Jonathan Edgar Roth, San Francisco, CA (US); Jared Bauters, Santa Barbara, CA (US); Gregory Alan Fish, Santa Barbara, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 15/685,114

(22) Filed: Aug. 24, 2017

(65) Prior Publication Data

US 2019/0064457 A1   Feb. 28, 2019

(51) Int. Cl.
*G02B 6/00*   (2006.01)
*G02B 6/42*   (2006.01)

(52) U.S. Cl.
CPC ......... *G02B 6/4213* (2013.01); *G02B 6/4206* (2013.01); *G02B 6/4208* (2013.01)

(58) Field of Classification Search
CPC ... G02B 6/4213; G02B 6/4206; G02B 6/4208
See application file for complete search history.

(56) References Cited

U.S. PATENT DOCUMENTS 5,724,184 A * 3/1998 Hesline ................ G02B 27/283
                                                    359/489.09

6,014,254 A * 1/2000 Cheng ..................... G02B 6/272
                                                    359/282

(Continued)

FOREIGN PATENT DOCUMENTS

| CN | 109791255 | | 5/2019 |
|---|---|---|---|
| WO | WO 2015032095 | * | 3/2015 |
| WO | WO-2016160679 | A1 | 10/2016 |
| WO | WO-2017106880 | A1 | 6/2017 |
| WO | WO-2019040765 | A1 | 2/2019 |

OTHER PUBLICATIONS

"International Application Serial No. PCT/US2018/047777, International Search Report dated Nov. 13, 2018", 5 pgs.
"International Application Serial No. PCT/US2018/047777, Written Opinion dated Nov. 13, 2018", 6 pgs.

*Primary Examiner* — Ellen E Kim
(74) *Attorney, Agent, or Firm* — Schwegman Lundberg & Woessner, P.A.

(57) ABSTRACT

An optical coupling device can couple incident light from a fiber into waveguides, but can reduce the coupling of return light from the waveguides into the fiber. A Faraday rotator layer can rotate by forty-five degrees, with a first handedness, respective planes of polarization of incident beams, and can rotate by forty-five degrees, with a second handedness opposite the first handedness, respective planes of polarization of return beams. A redirection layer can include at least one grating coupler that can redirect an incident beam of one polarization so that the redirected path extends within the redirection layer toward a first waveguide, and can redirect an incident beam of an opposite polarization so that the redirected path extends within the redirection layer toward a second waveguide. An optional birefringent layer can spatially separate incident beam having different polarizations, so that two single-polarization grating couplers can be used.

18 Claims, 16 Drawing Sheets

(56) References Cited

U.S. PATENT DOCUMENTS

| | | | |
|---|---|---|---|
| 8,660,391 B1* | 2/2014 | Fish | B82Y 20/00 |
| | | | 359/484.03 |
| 9,453,969 B2* | 9/2016 | Kobyakov | G02B 6/305 |
| 2002/0090017 A1* | 7/2002 | Hagberg | H01S 5/141 |
| | | | 372/108 |
| 2002/0168128 A1 | 11/2002 | Chang et al. | |
| 2006/0023987 A1* | 2/2006 | Yao | G01J 4/00 |
| | | | 385/11 |
| 2009/0009668 A1* | 1/2009 | Tan | G02B 5/3016 |
| | | | 349/1 |
| 2010/0006784 A1* | 1/2010 | Mack | H04B 10/503 |
| | | | 250/551 |
| 2012/0205524 A1* | 8/2012 | Mack | H04B 10/503 |
| | | | 250/225 |
| 2013/0336664 A1* | 12/2013 | Mack | H04B 10/503 |
| | | | 398/184 |
| 2014/0306131 A1* | 10/2014 | Mack | H04B 10/503 |
| | | | 250/551 |
| 2015/0218947 A1 | 8/2015 | Vogel et al. | |
| 2016/0294155 A1* | 10/2016 | Zheng | H01S 5/0228 |
| 2016/0377811 A1* | 12/2016 | Goodwill | G02B 6/2706 |
| | | | 385/24 |

* cited by examiner

OPTICAL COUPLER INCLUDING A FARADAY ROTATOR LAYER AND AT LEAST ONE GRATING COUPLER

TECHNICAL FIELD

The present disclosure relates to a device for coupling light between an optical fiber and waveguides.

BACKGROUND

An on-chip light source can deliver light to a photonic integrated circuit. An optical fiber can deliver the light from the photonic integrated circuit. It is desirable to reduce or eliminate light directed back from the optical fiber to the on-chip light source, which can cause noise or other instability in the light from the on-chip light source.

BRIEF DESCRIPTION OF THE DRAWINGS

In the following detailed description of example embodiments of the invention, reference is made to the accompanying drawings which form a part hereof, and which is shown by way of illustration only, specific embodiments in which the invention may be practiced. It is to be understood that other embodiments may be utilized and structural changes may be made without departing from the scope of the present invention.

Corresponding reference characters indicate corresponding parts throughout the several views. Elements in the drawings are not necessarily drawn to scale. The configurations shown in the drawings are merely examples, and should not be construed as limiting the scope of the invention in any manner.

DETAILED DESCRIPTION

Some optical devices can include an on-chip light source, such as a laser. A photonic integrated circuit can include one or more waveguides that can direct light from the on-chip light source to other portions of the chip, as needed. To direct light away from the chip, a coupling device can couple light from one or more of the waveguides to an optical fiber. Reflections from one or both ends of the fiber can feed back into the waveguides, and can create spurious lasing effects or additional noise in the light output from the on-chip light source.

The optical coupling device discussed in detail below can reduce or eliminate such unwanted feedback, by reducing or eliminating coupling of light of the same polarization state back into the waveguide (e.g., from a waveguide, to the fiber, and back to the waveguide). For example, an on-chip light source can produce light. The light can pass from a first waveguide, to the grating coupler or couplers, to the fiber. If the light returns from the fiber without any change in polarization state, as would be the case from a reflection from an end of the fiber, then the light returns to the grating coupler or couplers, then passes to a second waveguide, which is different from the first waveguide. The second waveguide directs the light from the fiber away from the on-chip light source, which can reduce or eliminate the spurious lasing effects or additional noise in the light output from the on-chip light source. The device can be formed as a layered structure, which can take advantage of wafer-level processes to reduce a cost of the device and improve the device-to-device uniformity of the device.

Although the optical coupling device may be used to reduce feedback for an on-chip light source, with an optical path extending from a waveguide to a fiber, and back to the waveguide, it is simpler to discuss the optical path and the optical components starting with the fiber, and extending toward the waveguides. The discussion in the remainder of this document uses such a convention, where light propagating from a fiber to a waveguide is "incident" light, and light propagating from the waveguide to the fiber is "return" light. Such a naming convention assumes that the light is delivered via the fiber, but it will be understood that the optical devices discussed below can also be used with an on-chip light source coupled to one of the waveguides.

Figure 1:
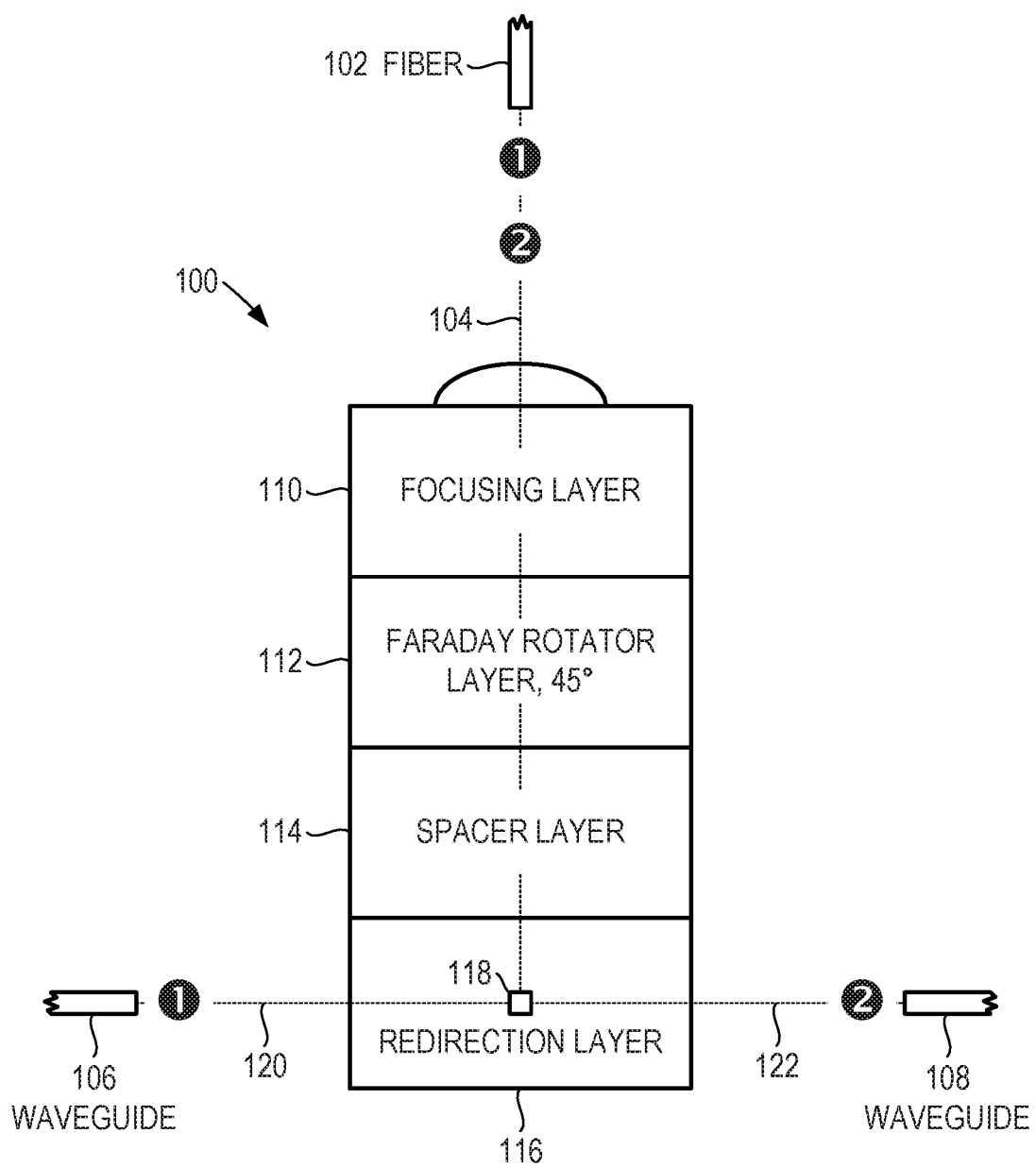
FIG. 1 shows an example of a device that can couple incident light from a fiber into waveguides, and can reduce the coupling of return light from the waveguides into the fiber, in accordance with some embodiments.
Figure 2:
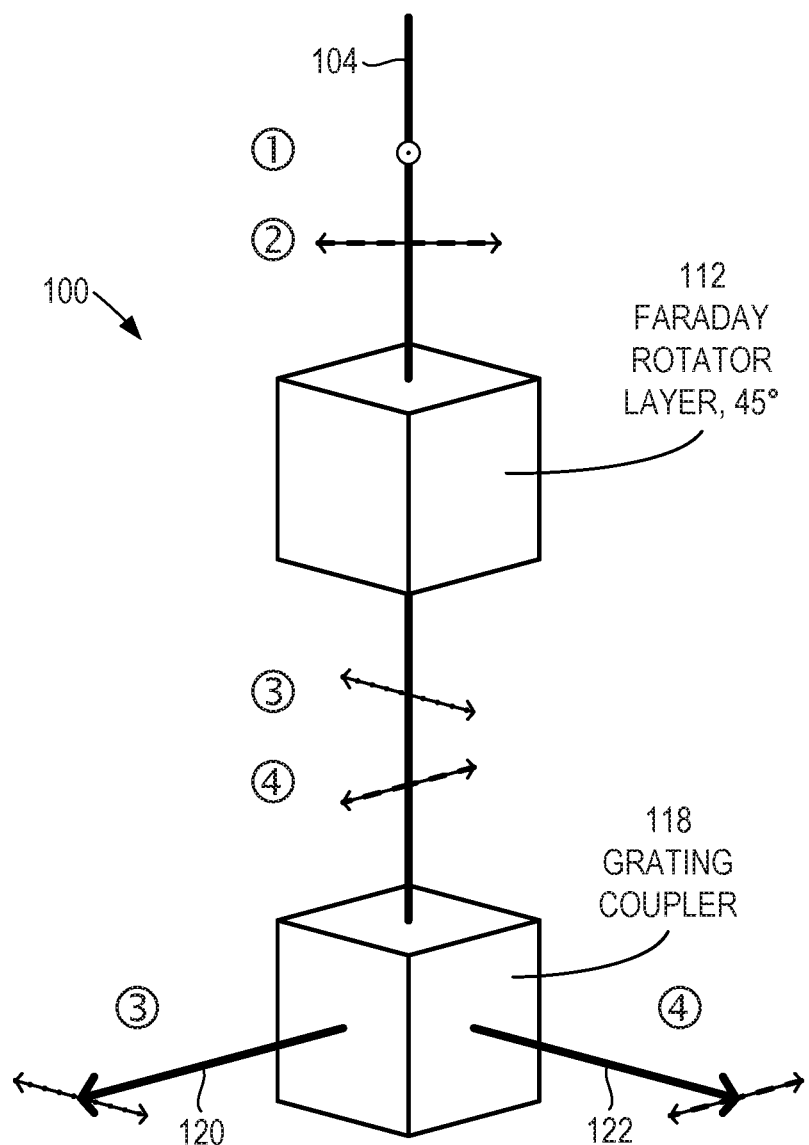
FIG. 2 shows an example of incident light propagating through the device of FIG. 1, in accordance with some embodiments.
Figure 3:
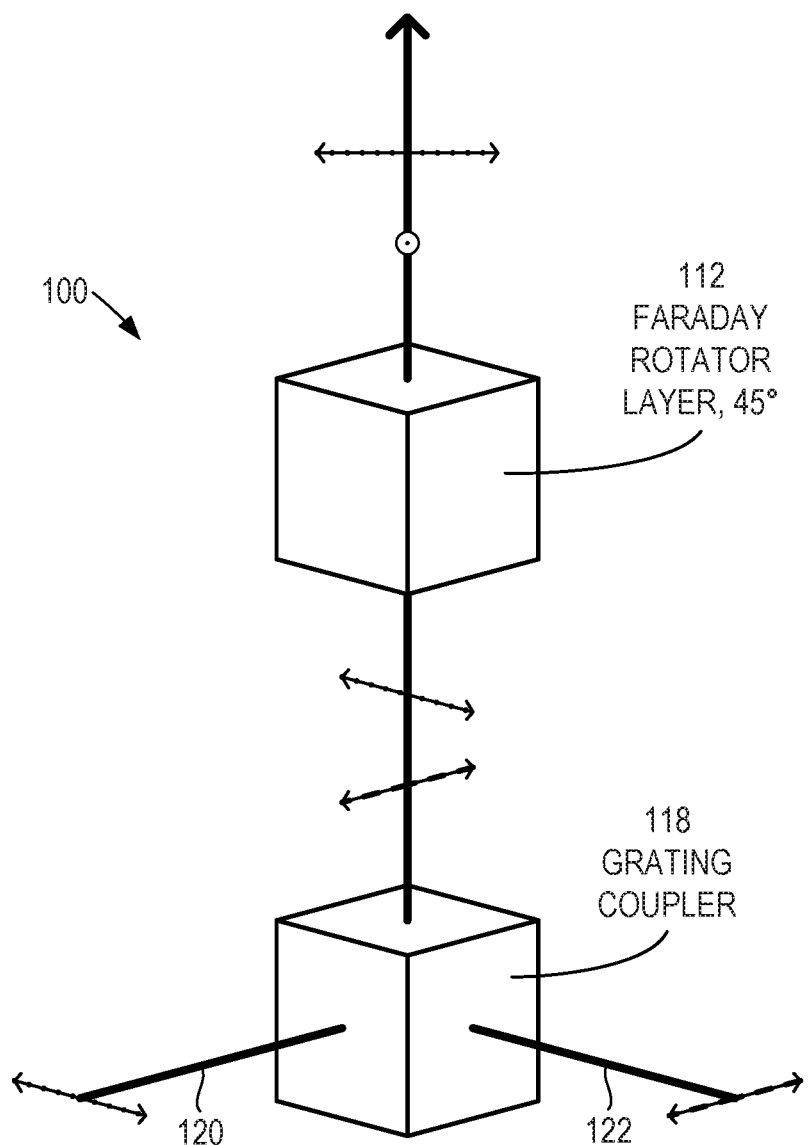
FIG. 3 shows an example of return light propagating through the device of FIG. 1, in accordance with some embodiments.

In a first configuration, shown in FIGS. 1-3, the device can use a forty-five-degree Faraday rotator to manipulate a polarization state of beams propagating through the device, so that light with a particular polarization orientation can return having an orthogonal polarization orientation. Because lasing effects can be sensitive to polarization state, this configuration can help reduce spurious lasing effects. The configuration of FIGS. 1-3 uses a dual-polarization grating coupler.

Figure 6:
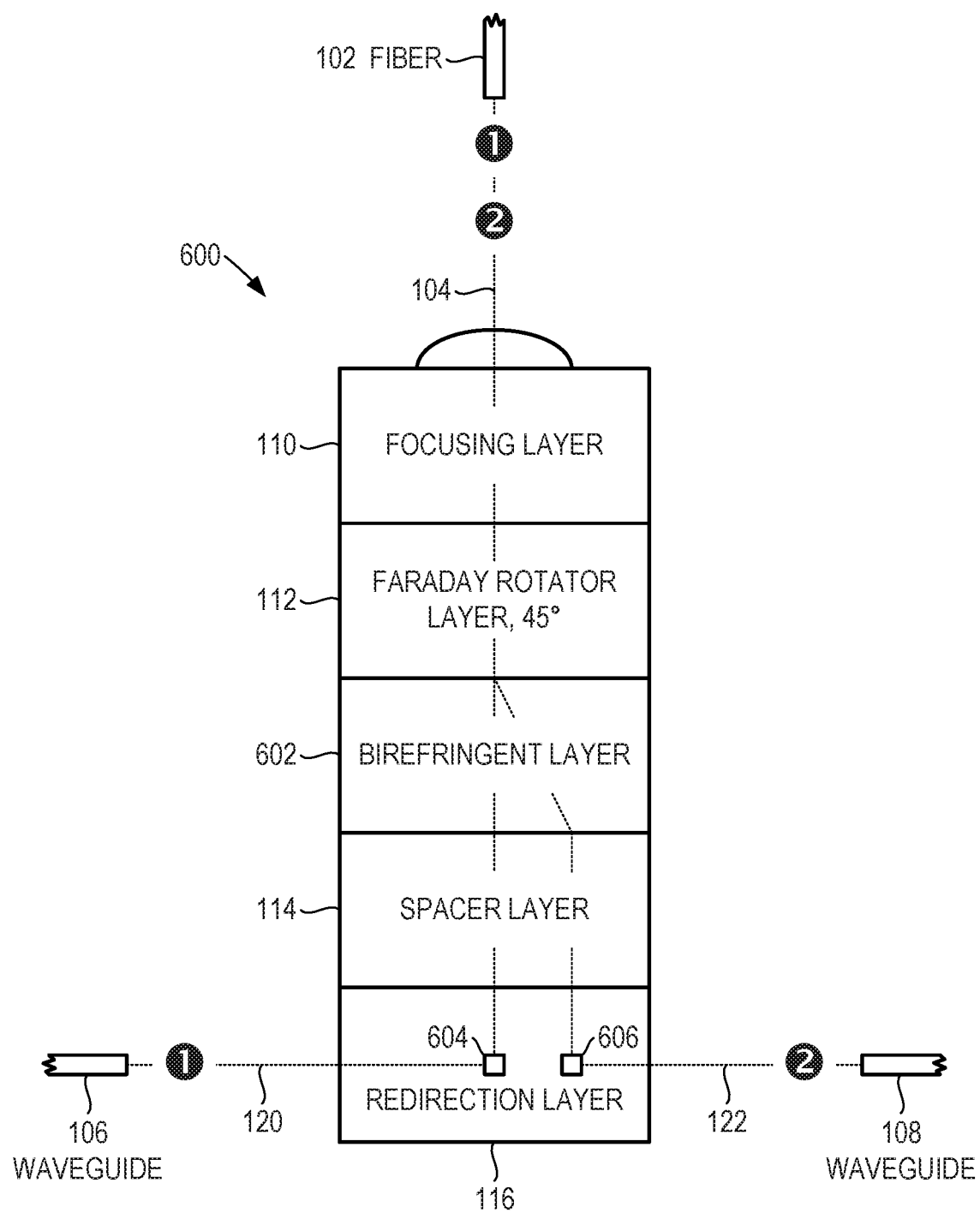
FIG. 6 shows an example of another device that can couple incident light from a fiber into waveguides, and can reduce the coupling of return light from the waveguides into the fiber, in accordance with some embodiments.
Figure 7:
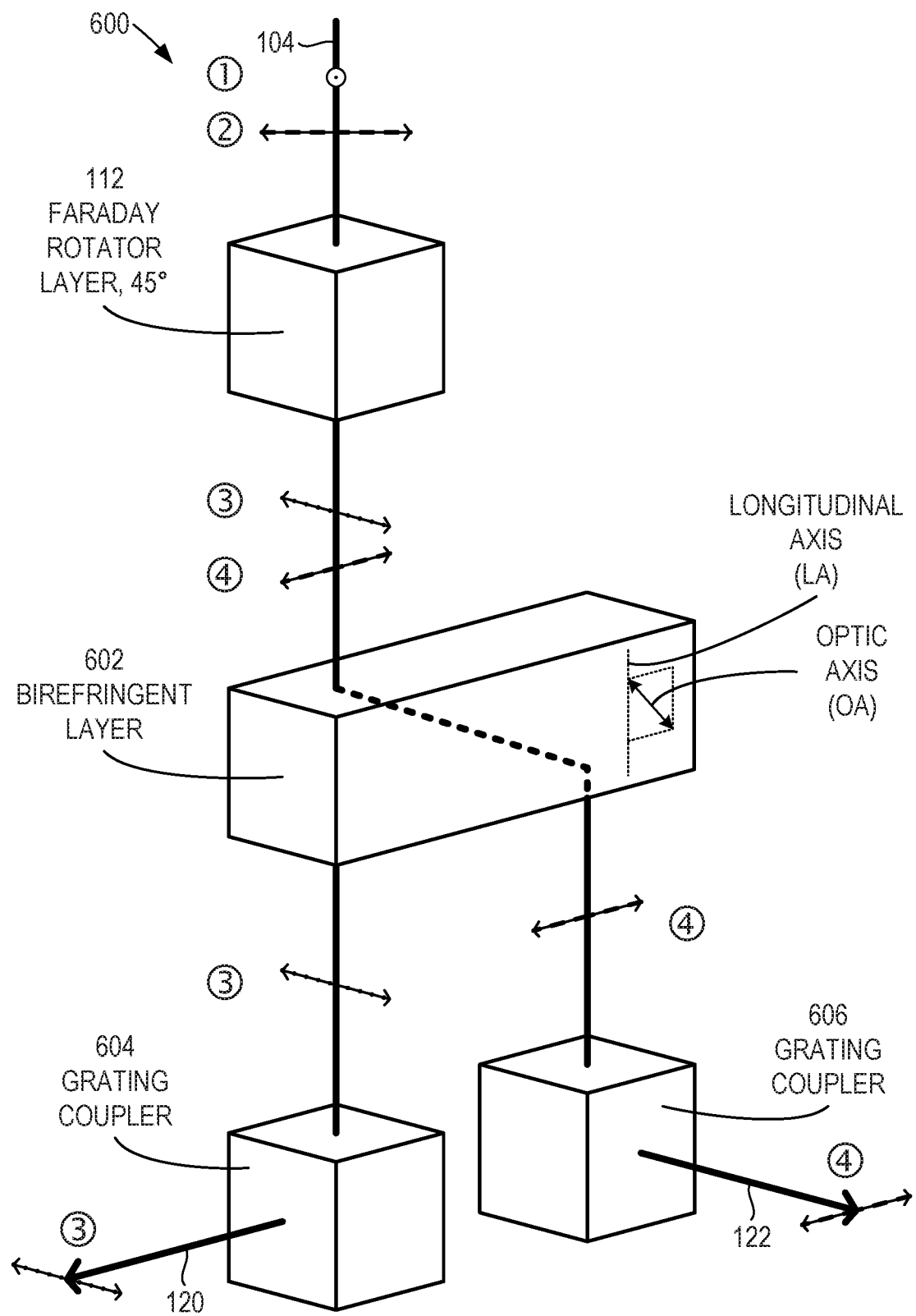
FIG. 7 shows an example of incident light propagating through the device of FIG. 6, in accordance with some embodiments.
Figure 8:
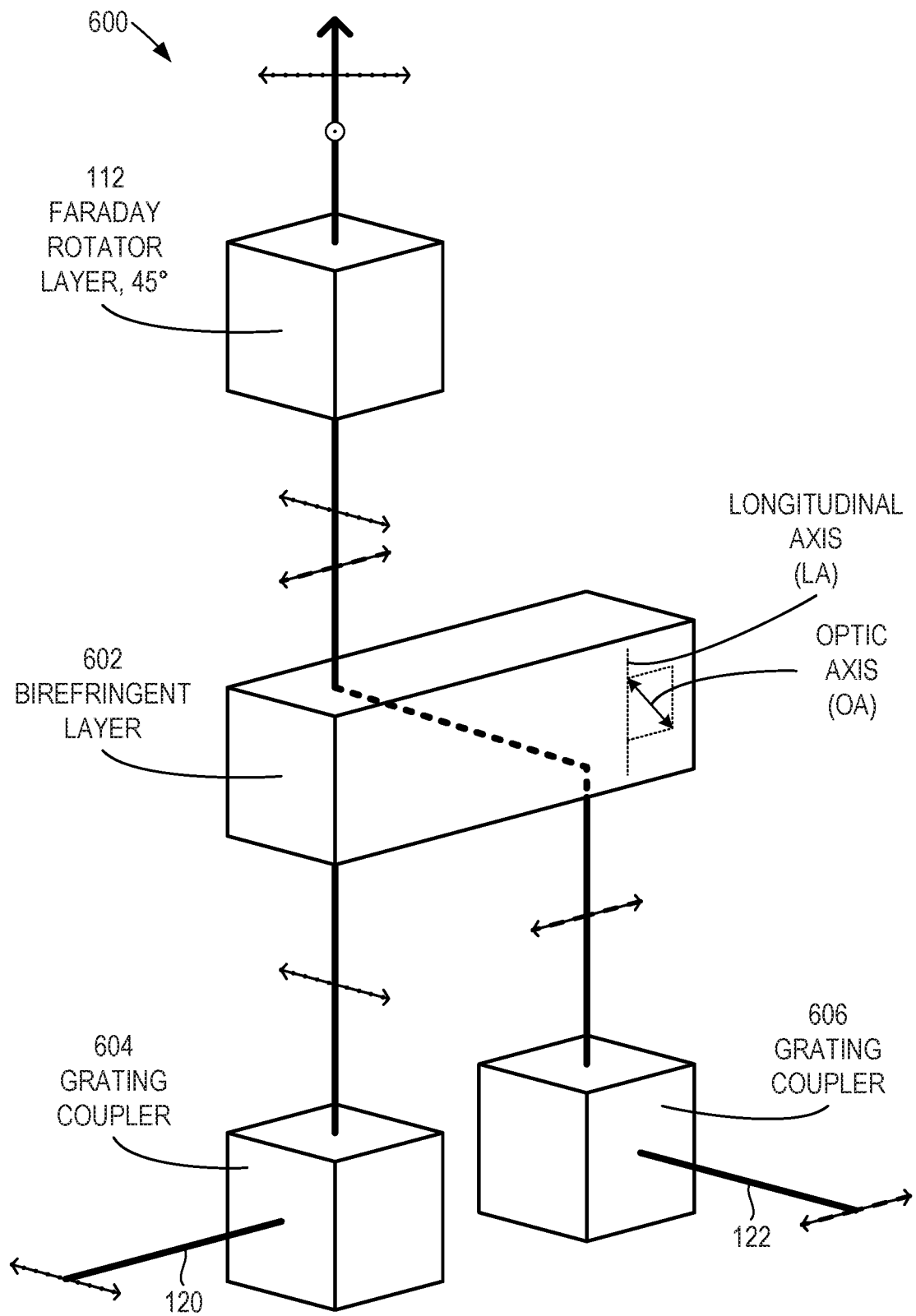
FIG. 8 shows an example of return light propagating through the device of FIG. 6, in accordance with some embodiments.

In a second configuration, shown in FIGS. 6-8, the device improves over the first configuration by adding a birefringent layer to spatially separate the two polarization states, and uses two single-polarization grating couplers instead of a single dual-polarization grating coupler. Such single-polarization grating couplers can have a higher coupling efficiency than a comparable dual-polarization grating coupler, so that the overall coupling efficiency of the device can be improved. In the first and second configurations, undesirable return light returns with an orthogonal polarization state.

Figure 11:
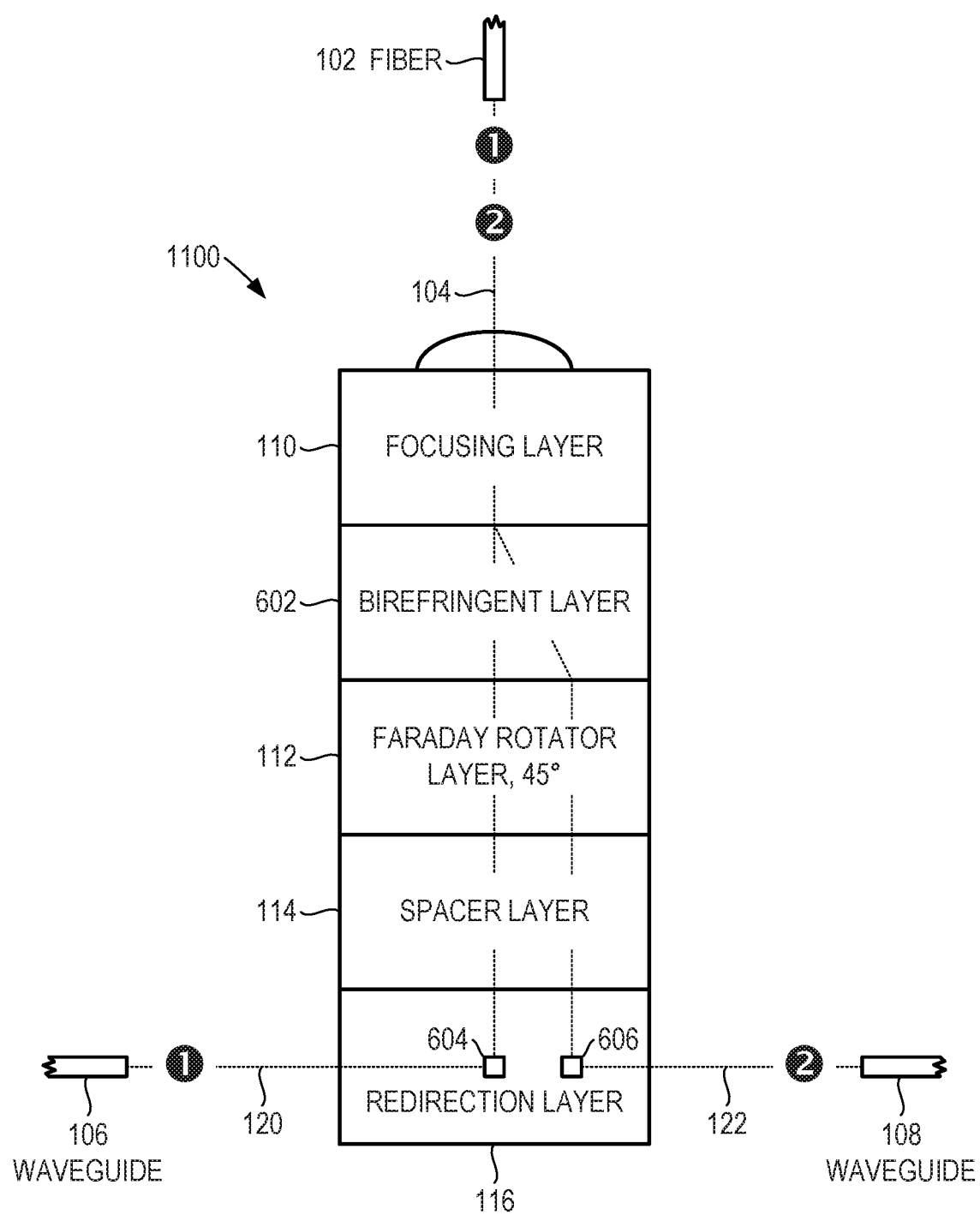
FIG. 11 shows an example of another device that can couple incident light from a fiber into waveguides, and can reduce the coupling of return light from the waveguides into the fiber, in accordance with some embodiments.
Figure 12:
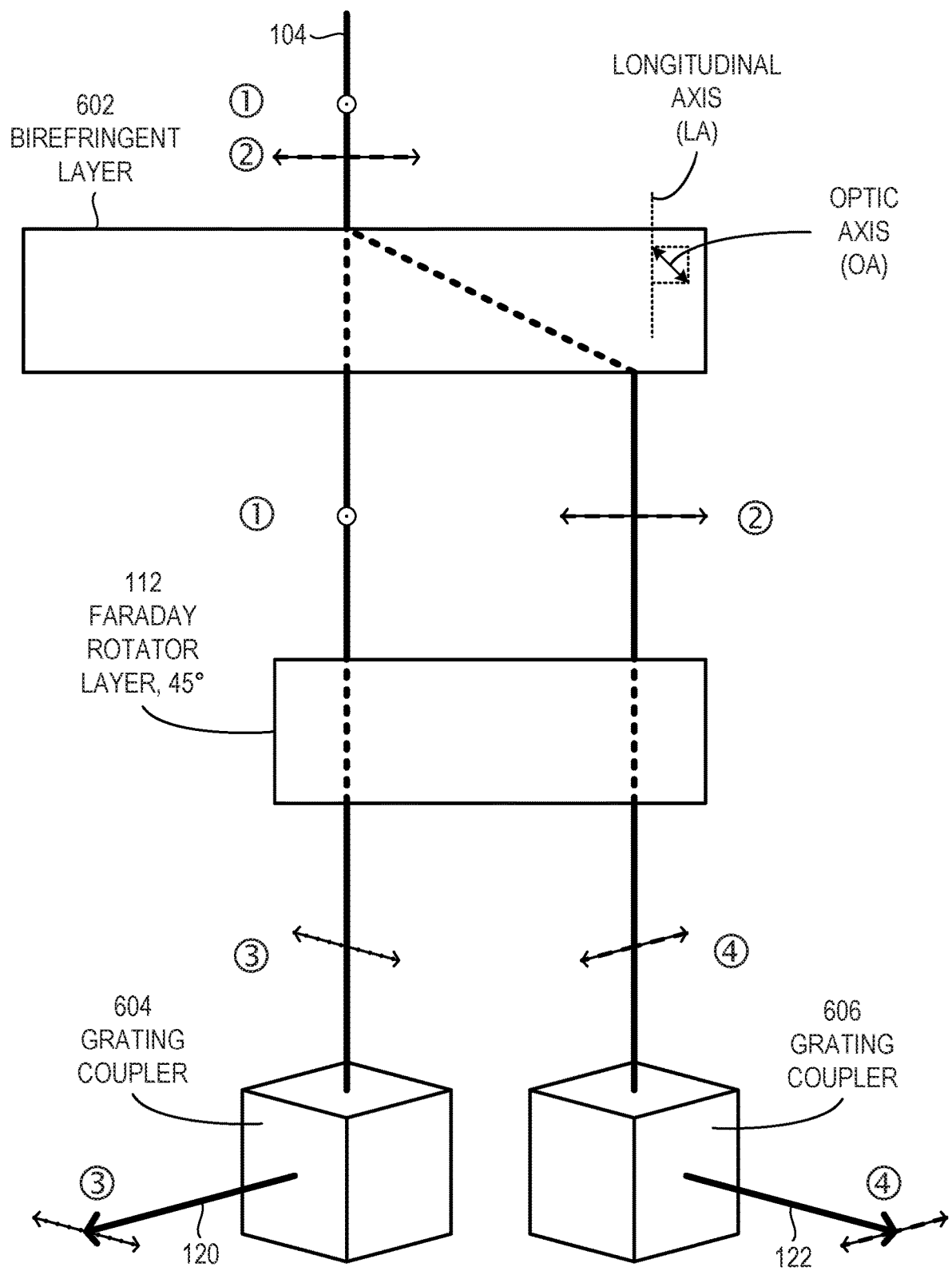
FIG. 12 shows an example of incident light propagating through the device of FIG. 11, in accordance with some embodiments.
Figure 13:
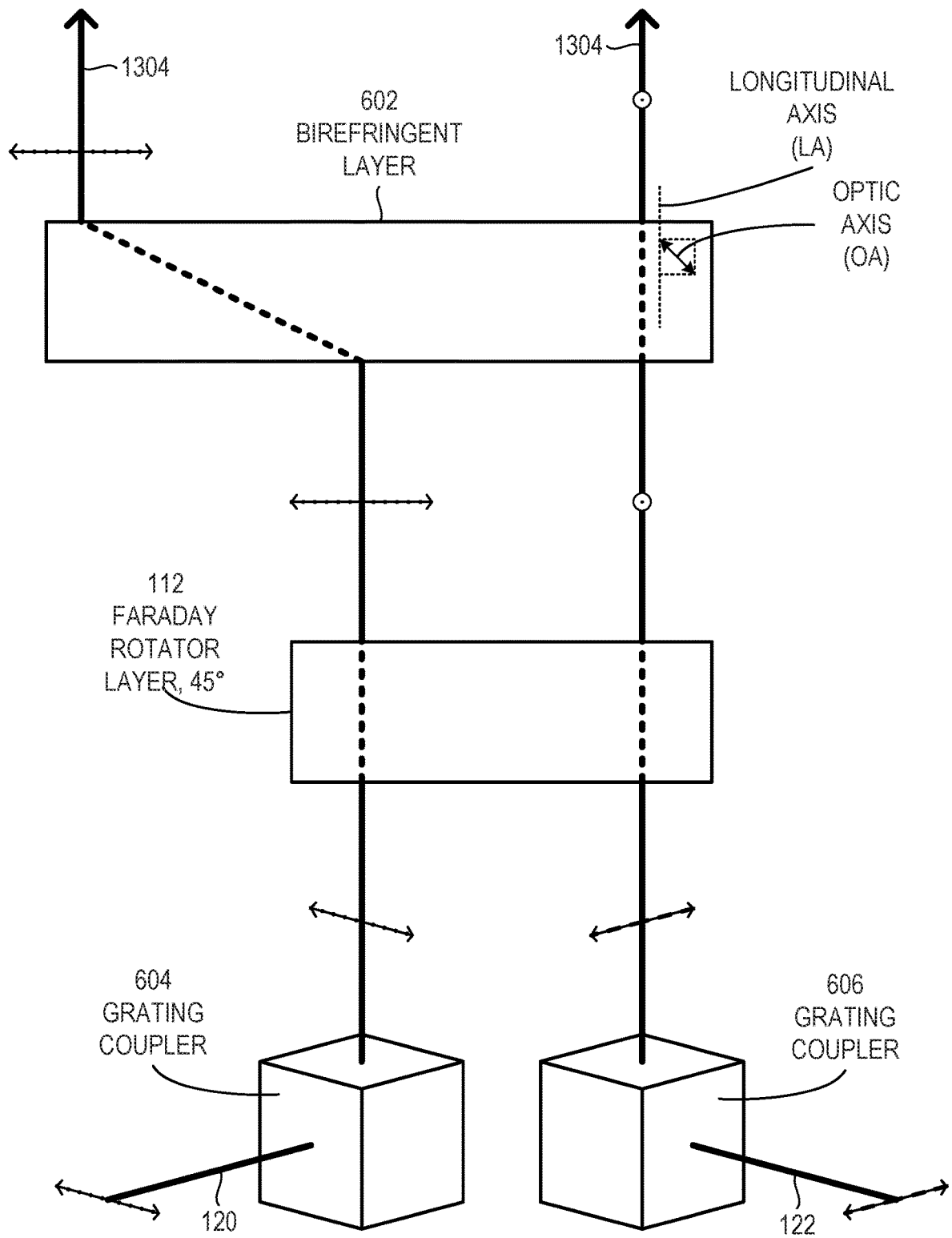
FIG. 13 shows an example of return light propagating through the device of FIG. 11, in accordance with some embodiments.

In a third configuration, shown in FIGS. 11-13, the device improves over the first and second configurations by reversing the order of the Faraday rotator layer and the birefringent layer. Doing so can change a physical optical path traversed by return light in the birefringent layer, and can allow the device to direct the return light to a different physical location. Directing the return light to a different physical location can dramatically reduce the coupling, and can provide an additional degree of optical isolation for the coupling device, in addition to rotating the plane of polarization.

It is instructive to clarify the terms "light" and "path", as used in this document. Light (e.g., such as first light, second light, and so forth) is intended to represent a beam of light, or a collection of light rays. A beam can have a cross-sectional size, which can be referred to as a footprint. A beam can be collimated, so that the footprint remains at a constant size as the beam propagates. A beam can be converging, so that the footprint shrinks as the beam propagates. A beam can be diverging, so that the footprint grows as the beam propagates. A beam can change in cross-sectional size, divergence, and direction as it propagates throughout an optical system. In this document, a beam can emerge from an optical fiber and couple into a waveguide, or can emerge from a waveguide and couple into an optical fiber. A path is intended to represent a central axis of a beam as it propagates. The beams can propagate along the paths, in both an incident direction (fiber-to-waveguide) and a return direction (waveguide-to-fiber).

Throughout this document, there are four lights (e.g., four beams) that are used repeatedly among the various system configurations. For convenience, these four lights are designated as first, second, third, and fourth, although there is no significance to the numbering order. In the figures, the first, second, third, and fourth lights are labeled with encircled numerals one, two, three, and four, with black numerals on a white background.

There are also two paths that are used repeatedly among the various system configurations. For convenience, these two paths are designated as first and second, although there is no significance to the numbering order. In the figures, the first and second paths are labeled with encircled numerals one and two, with white numerals on a black background. The first and second optical paths can overlap in one portion of the optical coupling device, and can diverge in another portion of the optical coupling device.

The following paragraph defines the four lights and two paths used throughout the document. The paragraph can also provide a summary of all three system configurations in generality. The details of each configuration are provided in the discussion below.

In an example, a device can include a Faraday rotator layer. The Faraday rotator layer can receive first light having a first polarization orientation. The Faraday rotator layer can receive second light having a second polarization orientation orthogonal to the first polarization orientation. The Faraday rotator layer can propagate the first light through the Faraday rotator layer to form third light. The third light can have a third polarization orientation angled by forty-five degrees with respect to the first polarization orientation. The Faraday rotator layer can propagate the second light through the Faraday rotator layer to form fourth light. The fourth light can have a fourth polarization orientation angled by forty-five degrees with respect to the second polarization orientation. The device can further include a planar redirection layer. The redirection layer can include at least one grating coupler. The redirection layer can redirect the third light to propagate along a first redirected path within the redirection layer and redirect the fourth light to propagate along a second redirected path within the redirection layer. The second redirected path can be angled with respect to the first redirected path. A first optical path can extend from a fiber, through the device, to a first waveguide. A second optical path can extend from the fiber, through the device, to a second waveguide.

The preceding paragraph is merely a summary of the subject matter that follows, and should be not be construed as limiting in any way. The following discussion provides additional details regarding each configuration.

FIG. 1 shows an example of a device 100 that can couple incident light from a fiber into waveguides, but can reduce the coupling of return light from the waveguides into the fiber, in accordance with some embodiments. FIG. 2 shows an example of incident light propagating through the device 100 of FIG. 1, in accordance with some embodiments. FIG. 3 shows an example of return light propagating through the device 100 of FIG. 1, in accordance with some embodiments. FIGS. 1-3 are discussed in tandem below.

A Faraday rotator layer 112 can receive first light having a first polarization orientation. The Faraday rotator layer 112 can receive second light having a second polarization orientation orthogonal to the first polarization orientation. The Faraday rotator layer 112 can propagate the first light through the Faraday rotator layer to form third light. The third light can have a third polarization orientation angled by forty-five degrees with respect to the first polarization orientation. The Faraday rotator layer 112 can propagate the second light through the Faraday rotator layer 112 to form fourth light. The fourth light can have a fourth polarization orientation angled by forty-five degrees with respect to the second polarization orientation.

A planar redirection layer 116 can include at least one grating coupler 118. The redirection layer 116 can redirect the third light to propagate along a first redirected path 120 within the redirection layer 116 and redirect the fourth light to propagate along a second redirected path 122 within the redirection layer 116. The second redirected path 116 can be angled with respect to the first redirected path 120. In some examples, the first redirected path can be orthogonal to the second redirected path. In some examples, on the first and second redirected paths 120, 122, the redirected third light and the redirected fourth light can have respective polarization orientations that are parallel to a plane of the redirection layer 116.

A first optical path can extend from a fiber 102, through the device 100, to a first waveguide 106. A second optical path can extend from the fiber 102, through the device 100, to a second waveguide 108.

The components of the device 100 are discussed in further detail below.

An optical fiber 102 can deliver light 104 from an off-chip light source, such as one or more laser diodes and/or one or more light emitting diodes. In some examples, the light 104 from the fiber is continuous-wave. In other examples, the light 104 from the fiber can include a data stream modulated onto the light. The optical fiber 102 can be a single-mode fiber or a multi-mode fiber, with any suitable core and cladding configuration. Whereas the device 100 can be a layered structure, formed from a stack of generally planar layers, the optical fiber 102 can deliver the light 104 to the device 100 through a top (or bottom) surface of the layers, so that the delivered light can propagate through the layers. In some examples, the optical fiber 102 can be positioned to direct the light 104 into the device 100 along a longitudinal axis, the longitudinal axis being orthogonal to a plane of one or more of the layers. In other examples, the optical fiber 102 can direct the light 104 into the device 100 at an angle with respect to the longitudinal axis. In some examples, the optical fiber 102 is not part of the device 100. In other examples, the optical fiber 102 can be considered to be part of the device 100.

In some examples, an optional focusing layer 110 can impart a convergence onto the first light such that the redirected third light is focused onto a longitudinal end of the first waveguide 106. The optional focusing layer 110 can impart a convergence onto the second light such that the redirected fourth light is focused onto a longitudinal end of the second waveguide 108. The convergence can impart a mode shape that efficiently couples the energy into waveguide modes. In some examples, the focusing layer 110 can include a first surface that includes one or more curved features, and a second surface contacting the first surface of a Faraday rotator layer 112, or of another suitable layer downstream from the focusing layer 110. In some examples, the focusing layer 110 can include a lens. The lens can include optically isotropic materials, such as silica or air. The lens can include one or more surfaces. Each surface can have zero curvature (e.g., flat) or a finite curvature. In some examples, the lens can be attached directly to a photonic integrated circuit, either on a substrate surface or on a surface that includes waveguides. In some examples, a lens surface can be external to the photonic integrated circuit, separated by an air gap. In some examples, birefringent material can be attached directly to the photonic integrated circuit. In some examples, the lens and the birefringent material can be attached to one another but separated from the photonic integrated circuit by an air gap. In some examples, the lens can be attached to the birefringent material, which is attached to the photonic integrated circuit.

In the geometry of the configuration of FIGS. 1-3, the first light and the second light can be coincident along a single optical path. In the configuration of FIGS. 1-3, the redirection layer 116 can include a dual-polarization grating coupler 118. The dual-polarization grating coupler 118 can redirect the third light to propagate along the first redirected path 120 within the redirection layer 116 and redirect the fourth light to propagate along the second redirected path 122 within the redirection layer 116.

The Faraday rotator layer 112 can be positioned in the first and second paths adjacent the optical fiber 102, or if the focusing layer 110 is present, adjacent the focusing layer 110. The Faraday rotator layer 112 can rotate by forty-five degrees, with a first handedness, respective planes of polarization of the incident beams (FIG. 2). The Faraday rotator layer 112 can rotate by forty-five degrees, with a second handedness opposite the first handedness, respective planes of polarization of the return beams (FIG. 3). In the configuration of FIGS. 2 and 3, the Faraday rotator layer 112 imparts a forty-five degree rotation to the incident beams using a so-called left-hand screw rule, and imparts a forty-five degree rotation to the return beams using a so-called right-hand screw rule. In other configurations, the left-hand and right-hand screw rules can be swapped. In all of these configurations, the net effect of the Faraday rotator is that if light emerges from the optical fiber 102 with one polarization, it can reflect from a waveguide and return to the optical fiber 102 with an orthogonal polarization.

An optional spacer layer 114 can be positioned in the first and second paths adjacent the Faraday rotator layer 112. In some examples, the spacer layer 114 can be formed as a substrate, upon which a photonic integrated circuit can be formed. In some examples, the spacer layer 114 can be formed from an isotropic (e.g., non-birefringent) material. In some examples, the spacer layer 114 can have a first surface that contacts a second surface of the Faraday rotator layer 112.

The planar redirection layer 116 can be positioned in the first and second paths adjacent the Faraday rotator layer 112, or if the spacer layer 114 is present, adjacent the spacer layer 114. The redirection layer 116 can include at least one grating coupler. In some examples, the at least one grating coupler can be disposed on a surface of the redirection layer 116, such as on a top surface or a bottom surface of the redirection layer 116. In some examples, the at least one grating coupler can be disposed in a volume of the redirection layer 116, between the top and bottom surfaces of the redirection layer 116.

In the configuration of FIGS. 1-3, the redirection layer 116 includes a dual-polarization grating coupler 118. (In other configurations, such as those shown in FIGS. 6-8 and FIGS. 11-13 and discussed below, the redirection layer 116 can alternatively include two single-polarization grating couplers.) The dual-polarization grating coupler 118 can be configured such that the first and second paths coincide between the optical fiber 102 and the dual-polarization grating coupler 118 (e.g., from the optical fiber 102, through the optional focusing layer 110, through the Faraday rotator layer 112, through the optional spacer layer 114, to the dual-polarization grating coupler 118 at the redirection layer 116). The dual-polarization grating coupler 118 can redirect the third light (FIG. 2) to extend within the redirection layer 116 toward the first waveguide 106 on a first redirected path 120 (e.g., from the dual-polarization grating coupler 118 to the first waveguide 106). The dual-polarization grating coupler 118 can redirect the fourth light (FIG. 2) to extend within the redirection layer 116 toward the second waveguide 108 on a second redirected path 122 (e.g., from the dual-polarization grating coupler 118 to the second waveguide 108). The second redirected path 122 can be angled with respect to the first redirected path 120. In some examples, the first redirected path 120 can be orthogonal to the second redirected path 122. Other angles can also be used. In some examples, on the first and second redirected paths 120, 122, the redirected third light can have a polarization orientation parallel to a polarization orientation of the redirect fourth light. In some examples, on the first and second redirected paths 120, 122, the redirected third light and the redirected fourth light can have respective polarization orientations that are parallel to a plane of the redirection layer 116. In other examples, on the first and second redirected paths 120, 122, the redirected third light and the redirected fourth light can have respective polarization orientations that are orthogonal to a plane of the redirection layer 116.

Figure 4:
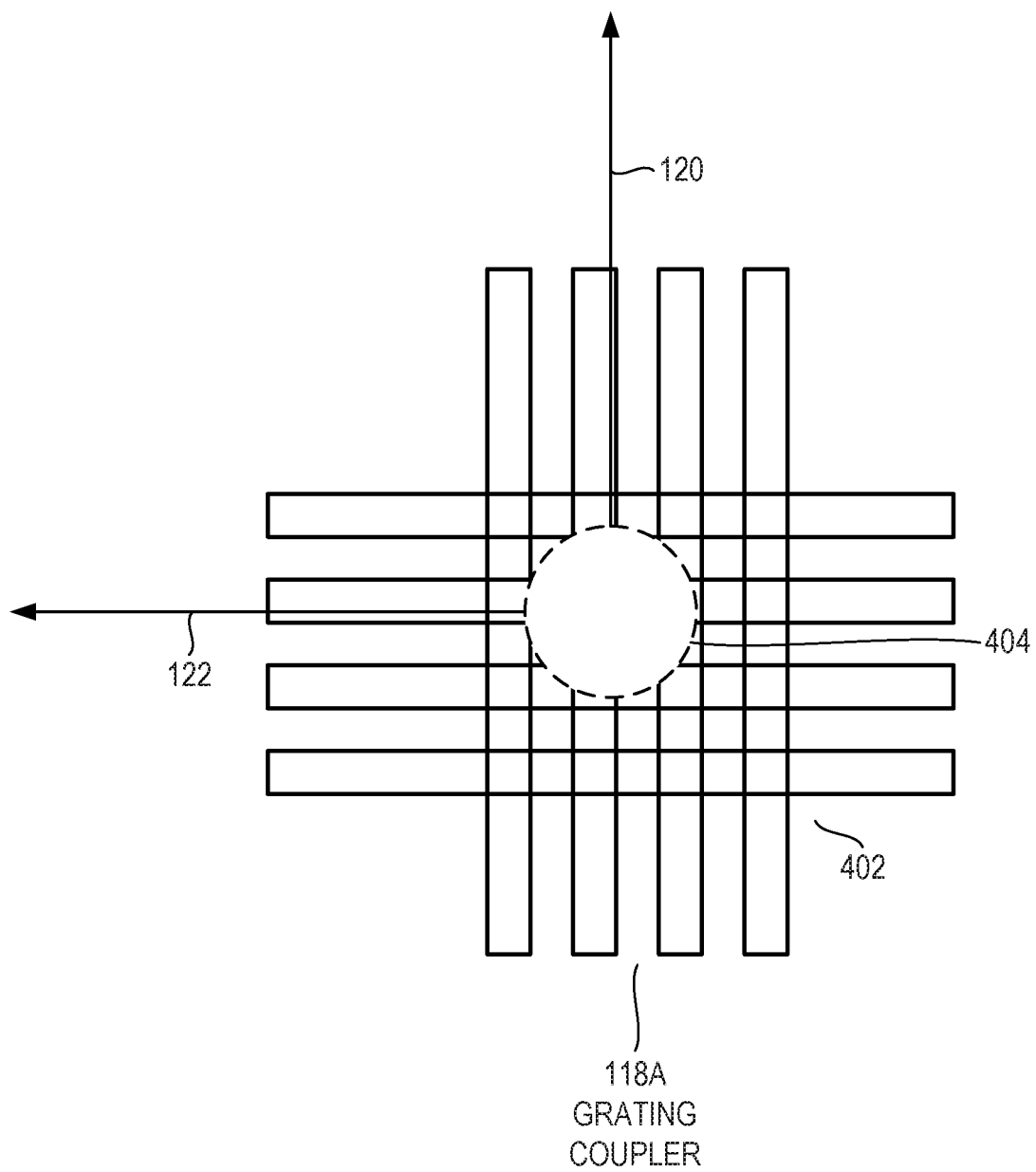
FIG. 4 shows an example of a dual-polarization grating coupler, in accordance with some embodiments.

FIG. 4 shows an example of a dual-polarization grating coupler 118A suitable for use in the device 100 of FIGS. 1-3, in accordance with some embodiments.

The dual-polarization grating coupler 118A can includes a region 402 in which a refractive index varies periodically in two directions, a first of the two directions being orthogonal to the first redirected path 120, a second of the two directions being orthogonal to the second redirected path 122. The region 402 can be sized larger than respective footprints 404 of the first and second beams.

Figure 5:
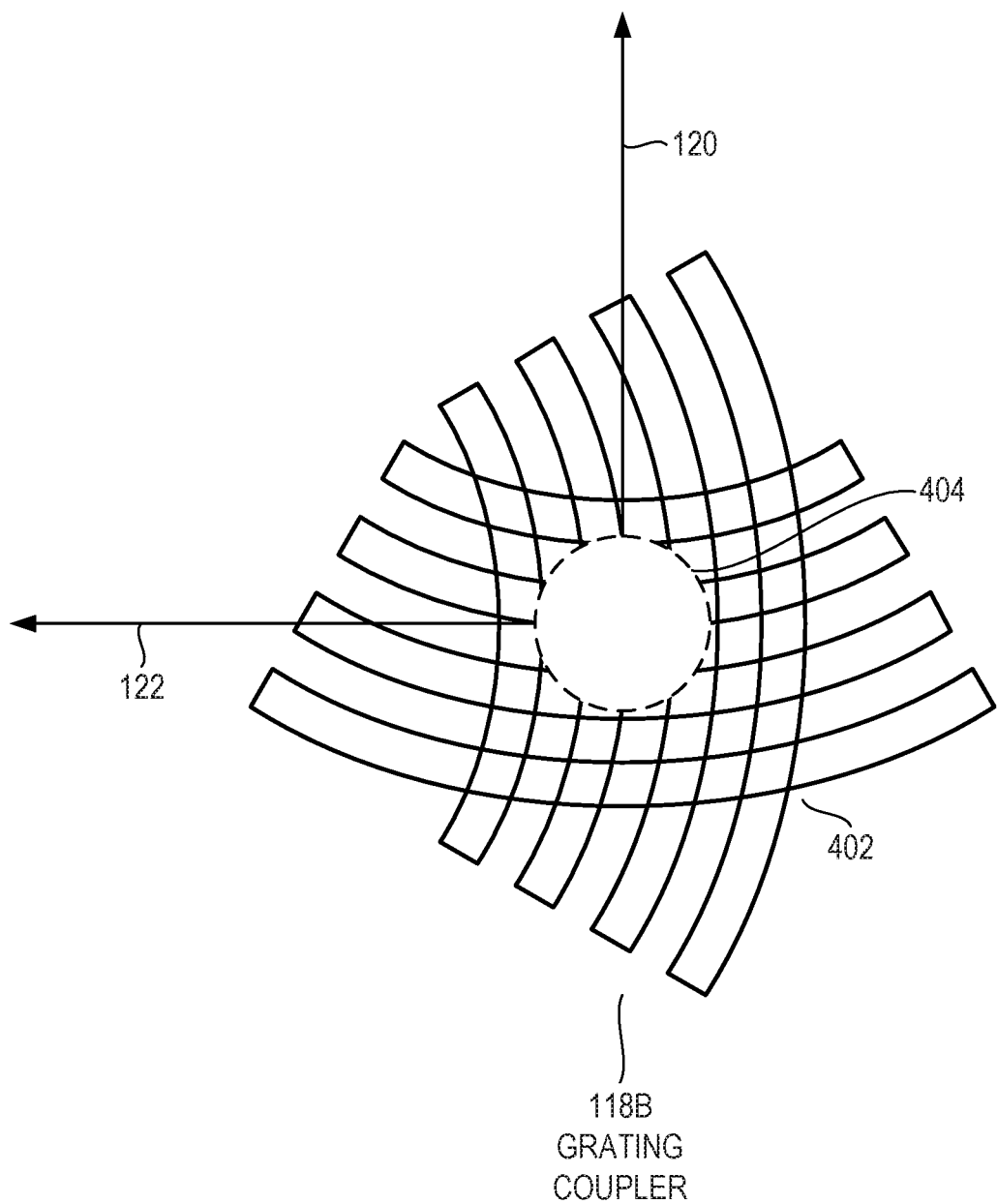
FIG. 5 shows another example of a dual-polarization grating coupler, in accordance with some embodiments.

FIG. 5 shows another example of a dual-polarization grating coupler 118 suitable for use in the device 100 of FIGS. 1-3, in accordance with some embodiments.

Compared with the dual-polarization grating coupler 118A of FIG. 4, the dual-polarization grating coupler 118B of FIG. 5 has the additional feature that the periodic variations in refractive index can be curved in shape. The curvature can focus the first and second beams onto longitudinal ends of the first and second waveguides 106, 108, respectively. The focusing effects of such curvature can augment or replace the focusing function of the optional focusing layer 110.

A potential improvement over the configuration of FIGS. 1-3 would be to use two single-polarization grating couplers, rather than a single dual-polarization grating coupler 118. A single-polarization grating coupler can be designed to have a high coupling efficiency for just one polarization state, which is generally easier than designing to have high coupling efficiencies simultaneously for two orthogonal polarization states. In order to use two single-polarization grating couplers, the device can add a birefringent layer that imparts a spatial separation between beams having two orthogonal polarization states. Such a configuration that uses a birefringent layer and two single-polarization grating couplers is shown in FIGS. 6-8.

FIG. 6 shows an example of another device 600 that can couple incident light from a fiber into waveguides, but can reduce the coupling of return light from the waveguides into the fiber, in accordance with some embodiments. FIG. 7 shows an example of incident light propagating through the device 600 of FIG. 6, in accordance with some embodiments. FIG. 8 shows an example of return light propagating through the device 600 of FIG. 6, in accordance with some embodiments. FIGS. 6-8 are discussed in tandem below.

Compared with the device 100 of FIGS. 1-3, the device 600 of FIGS. 6-8 can further include a birefringent layer 602 positioned between the Faraday rotator layer 112 and the redirection layer 116. The birefringent layer 602 can impart a spatial separation between the third light and the fourth light, such that the third light and the fourth light coincide upon exiting the Faraday rotator layer 112, the third light is angled with respect to the fourth light within the birefringent layer 602, and the third light and the fourth light are parallel and spatially separated between the birefringent layer 602 and the redirection layer 116.

A birefringent layer 602, positioned in the first and second paths, can impart a spatial separation between the first and second paths, such that the first and second paths coincide between the optical fiber 102 and the birefringent layer 602 (e.g., from the optical fiber 102, through the optional focusing layer 110, and through the Faraday rotator layer 112, to a first surface of the birefringent layer 602 that faces the Faraday rotator layer 112). The first path can be angled with respect to the second path within the birefringent layer 602 (e.g. from the first surface of the birefringent layer 602, to a second surface of the birefringent layer 602 that opposes the first surface). The first and second paths can be parallel and spatially separated between the birefringent layer 602 and the at least one grating coupler (e.g., from the second surface of the birefringent layer 602, through the optional spacer layer 114, to the grating couplers at the redirection layer 116).

For an incident light beam that is orthogonal to the first surface of the birefringent layer 602, the first path can correspond to an ordinary ray, which propagates undeflected in the birefringent layer 602, while the second path can correspond to an extraordinary ray, which angularly deflects toward or away from the optic axis (OA) in the birefringent layer 602. For positive uniaxial birefringent materials, such as rutile, the extraordinary ray angularly deflects toward the optic axis (OA). For negative uniaxial birefringent materials, such as calcite and lithium niobate, the extraordinary ray angularly deflects away from the optic axis (OA). In FIG. 6 and subsequent figures, the birefringent layer 602 is formed from one or more positive uniaxial materials. It will be understood that negative uniaxial materials can alternatively be used for the birefringent layer 602. For both positive uniaxial materials and negative uniaxial materials, the angular deflection lies in the plane formed by an optic axis (OA; FIG. 7) of the birefringent layer 602 and a longitudinal axis (LA; FIG. 7) that is orthogonal to a plane of the redirection layer 116. In some examples, the birefringent layer 602 can include calcite, which has a relatively large birefringence. In some examples, the birefringent layer 602 can include calcite or lithium niobate, which are typically available in a wafer format from which pieces can be singulated to form the layered structure. In some examples, the first birefringent layer 602 can include rutile, which is also typically available in wafers, and can optionally be deposited directly on a wafer of a photonic integrated circuit.

In addition, the redirection layer 116 can include two single-polarization grating couplers 604, 606 having a spatial separation that matches the spatial separation between the third light and the fourth light. A first 604 of the two single-polarization grating couplers can redirect the third light to propagate along the first redirected path 120. A second 606 of the two single-polarization grating couplers can redirect the fourth light to propagate along the second redirected path 122.

In some examples, the first redirected path 120 can lie within a plane formed by an optic axis (OA) of the birefringent layer and a longitudinal axis (LA) that is orthogonal to a plane of the redirection layer 116. In some examples, the second redirected path 122 can be orthogonal to the plane formed by the optic axis (OA) and the longitudinal axis (LA). In some examples, on the first and second redirected paths 120, 122, the redirected third light and the redirected fourth light can have respective polarization orientations that are parallel to a plane of the redirection layer 116.

FIG. 7 shows the paths and polarization states of incident light (e.g., light propagating from fiber-to-waveguides). FIG. 8 shows the paths and polarizations states of return light (e.g., light propagating from waveguides-to-fiber). The Faraday rotator 112 can ensure that light from a fiber can propagating to a waveguide and return to the fiber with an orthogonal polarization state. The birefringent layer 602 can spatially separate two orthogonal polarization states. The spatially separated polarization states can allow the use of two single-polarization grating couplers 604, 606, which can have an improved coupling efficiency over a comparable single-polarization grating coupler.

A planar redirection layer 116, positioned in the first and second paths, can include two single-polarization grating couplers 604, 606 having a spatial separation that matches the spatial separation between the first and second paths. A first 604 of the two single-polarization grating couplers can redirect the first and third beams so that the first path extends within the redirection layer 116 toward the first waveguide 106 on a first redirected path 120 (e.g., from the first single-polarization grating coupler toward the first waveguide 106 within the redirection layer 116). A second 606 of the two single-polarization grating couplers can redirect the second and fourth beams so that the second path extends within the redirection layer 116 toward the second waveguide 108 on a second redirected path 122 (e.g., from the second single-polarization grating coupler toward the second waveguide 108 within the redirection layer 116). The second redirected path 122 can be angled with respect to the first redirected path 120. In some examples, the second redirected path 122 is orthogonal to the first redirected path 120.

In some examples, on the first and second redirected paths 120, 122, the first and second beams have respective polarization orientations that are parallel to a plane of the redirection layer 116. In other examples, on the first and second redirected paths 120, 122, the first and second beams can have respective polarization orientations that are perpendicular to a plane of the redirection layer 116, or angled with another suitable orientation.

In the configuration of FIGS. 6-8, the optical fiber 102, optional focusing layer 110, Faraday rotator layer 112, optional spacer layer 114, first waveguide 106, and second waveguide 108 are the same in structure and function as in the configuration of FIGS. 1-3.

Figure 9:
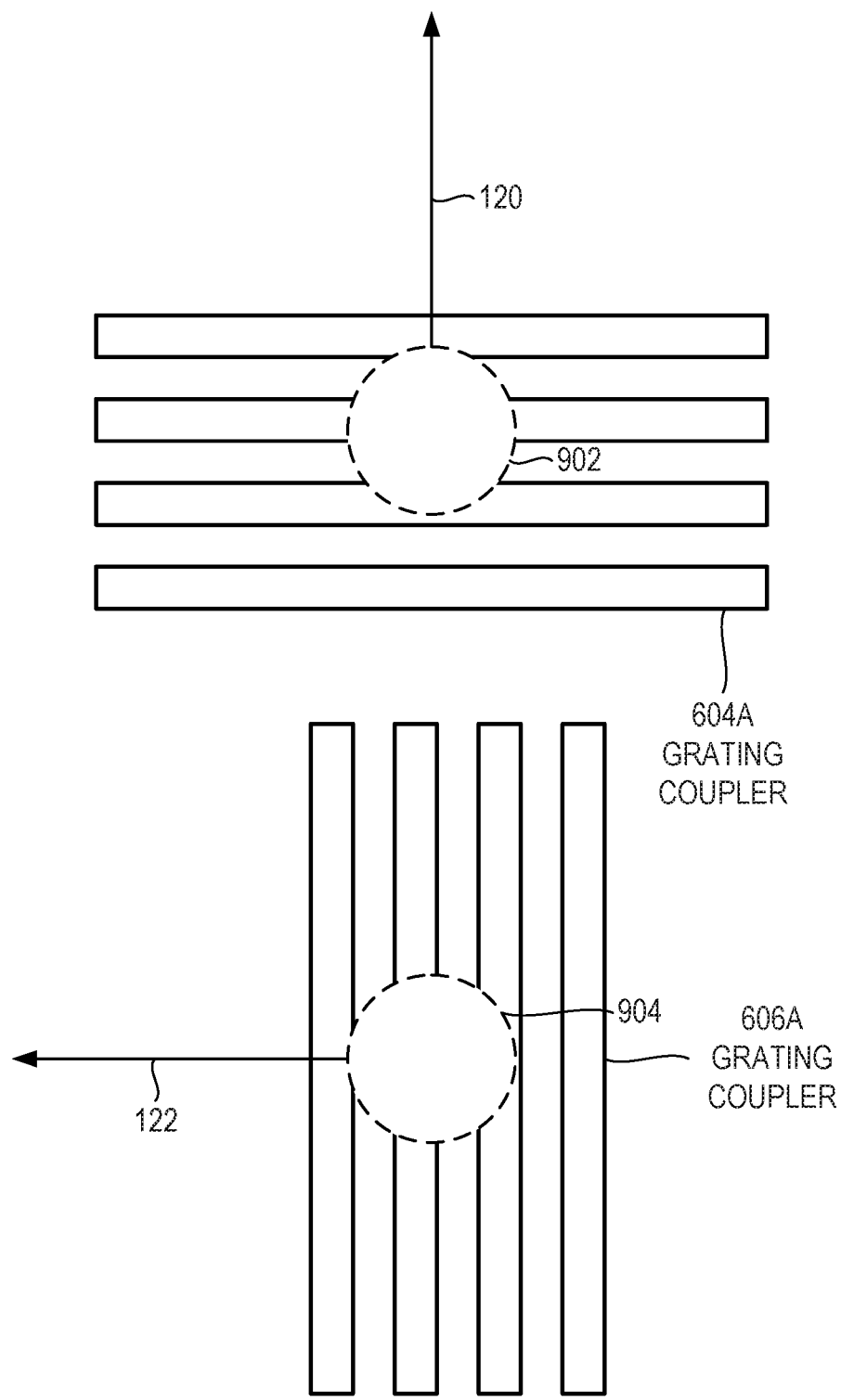
FIG. 9 shows an example of two single-polarization grating couplers, in accordance with some embodiments.

FIG. 9 shows an example of two single-polarization grating couplers 604A, 606A, suitable for use in the device 600 of FIGS. 6-8, in accordance with some embodiments.

The first 604A of the two single-polarization grating couplers can include a first region in which a refractive index varies periodically. The periodic variations of the first region can be oriented orthogonal to the first redirected path 120. The first region can be sized larger than a footprint 902 of the first and third beams at the first single-polarization grating coupler 604A.

The second 606A of the two single-polarization grating couplers can include a second region in which a refractive index varies periodically. The periodic variations of the second region can be oriented orthogonal to the second redirected path 122. The second region can be sized larger than a footprint 904 of the second and fourth beams at the second single-polarization grating coupler 606A.

Figure 10:
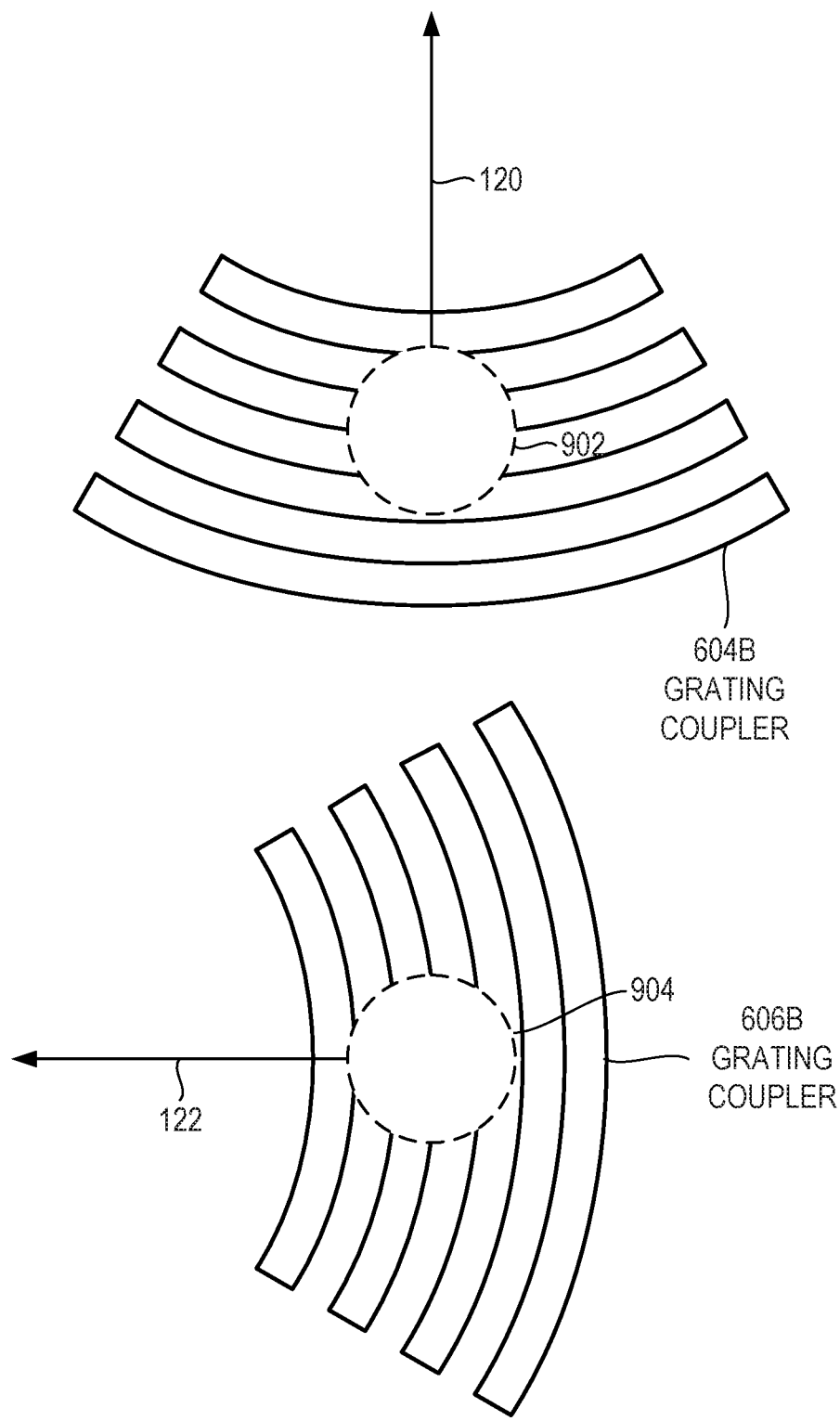
FIG. 10 shows another example of two single-polarization grating couplers, in accordance with some embodiments.

FIG. 10 shows another example of two single-polarization grating couplers 604B, 606B, suitable for use in the device 600 of FIGS. 6-8, in accordance with some embodiments.

Compared with the two single-polarization grating couplers 604A, 606A of FIG. 9, the two single-polarization grating couplers 604B, 606B of FIG. 10 have the additional feature that the periodic variations in refractive index can be curved in shape. The curvature can focus the first and second beams onto longitudinal ends of the first and second waveguides 106, 108, respectively. Specifically, in the first region, the periodic variations can be curved in shape, with a curvature configured to focus the first beam onto a longitudinal end of the first waveguide 106. In the second region, the periodic variations can be curved in shape, with a curvature configured to focus the second beam onto a longitudinal end of the second waveguide 108. The focusing effects of such curvature can add to or replace the focusing function of the optional focusing layer 110.

A potential improvement over the configuration of FIGS. 6-8 would be to use the Faraday rotator layer 112 after the birefringent layer 602, rather than before the birefringent layer 602. Doing so would rotate the polarization of light directed back into the birefringent layer 602. For example, incident light in an ordinary ray would become an extraordinary ray in return light. The undesirable return light would therefore traverse a different path within the birefringent layer 602, rather than doubling back on itself. This allow the device to direct the return light to a physical location away from the fiber. Directing the return light away from the fiber, which can dramatically reduce the coupling efficiency back into the fiber, can provide an additional degree of optical isolation for the coupling device, in addition to rotating the plane of polarization.

FIG. 11 shows an example of another device 1100 that can couple incident light from a fiber into waveguides, but can reduce the coupling of return light from the waveguides into the fiber, in accordance with some embodiments. FIG. 12 shows an example of incident light propagating through the device of FIG. 11, in accordance with some embodiments. FIG. 13 shows an example of return light propagating through the device of FIG. 11, in accordance with some embodiments. FIGS. 11-13 are discussed in tandem below.

In the configuration of FIGS. 11-13, the optical fiber 102, optional focusing layer 110, optional spacer layer 114, first waveguide 106, and second waveguide 108 are the same in structure and function as in the configuration of FIGS. 6-8. The birefringent layer 602 and Faraday rotator layer 112 can be the same in structure, but are swapped in position, compared to the configuration of FIGS. 6-8. In the configuration of FIGS. 11-13, along the first and second paths, the birefringent layer 602 is positioned between the Faraday rotator layer 112 and the optical fiber 102.

In the configuration of FIGS. 11-13, the birefringent layer 602 can be positioned such that the Faraday rotator layer 112 is positioned between the birefringent layer 602 and the redirection layer 116. The birefringent layer 602 can impart a spatial separation between the first light and the second light, such that the first light and the second light coincide before entering the birefringent layer 602, the first light is angled with respect to the second light within the birefringent layer 602, and the first light and the second light are parallel and spatially separated between the birefringent layer 602 and the Faraday rotator layer 112.

In the configuration of FIGS. 11-13, the redirection layer 116 can include two single-polarization grating couplers 604, 606 having a spatial separation that matches the spatial separation between the third light and the fourth light. A first 604 of the two single-polarization grating couplers can redirect the third light to propagate along the first redirected path 120. A second 606 of the two single-polarization grating couplers can redirect the fourth light to propagate along the second redirected path 122.

In a manner similar to that shown in FIG. 9, the first 604 of the two single-polarization grating couplers can include a first region in which a refractive index varies periodically. The periodic variations of the first region can be oriented orthogonal to the first redirected path 120. The second 606 of the two single-polarization grating couplers can include a second region in which a refractive index varies periodically. The periodic variations of the second region can be oriented orthogonal to the second redirected path 122.

In a manner similar to that shown in FIG. 10, in the first region, the periodic variations can be curved in shape, with a curvature configured to focus the redirected third light onto a longitudinal end of a first waveguide. In the second region, the periodic variations can be curved in shape, with a curvature configured to focus the redirected fourth light onto a longitudinal end of a second waveguide.

As best seen in FIGS. 12 and 13, the first redirected path 120 can angled at forty-five degrees with respect to a plane formed by an optic axis (OA) of the birefringent layer 602 and a longitudinal axis (LA) that is orthogonal to a plane of the redirection layer 116. The second redirected path 122 can be angled at forty-five degrees with respect to the plane formed by the optic axis (OA) of the birefringent layer 116 and the longitudinal axis (LA). On the first and second redirected paths 120, 122, the first and second beams can have respective polarization orientations that are parallel to the plane of the redirection layer 116. Alternatively, the first and second redirected paths can be angled at ninety degrees to the orientations shown in FIGS. 12 and 13, and the first and second beams can have respective polarization orientations that are orthogonal to the plane of the redirection layer 116.

Compared with the configuration of FIGS. 6-8, the configuration of FIGS. 11-13 additionally changes a physical optical path traversed by return light 1304 in the birefringent layer 602, which can allow the device to direct the return light 1304 to a physical location away from the fiber. Note that in FIG. 13, the fiber would be positioned directly above the grating coupler 604, so that light from both grating couplers 604, 606 is directed away from the fiber location. Directing the return light 1304 away from the fiber can dramatically reduce the coupling back into the fiber. This can provide an additional degree of optical isolation for the coupling device 1100, in addition to rotating the plane of polarization.

It is instructive to consider how the devices of FIGS. 1-3, 6-8, and 11-13 can be used in transmission and reception equipment.

For the configurations discussed above and shown in the figures, the three devices can be considered to be receiving elements. Each of the devices can receive a signal from a fiber, and can direct the received signal to a suitable waveguide. For these devices, the fiber-to-waveguide path can be considered to be an incident path, and the waveguide-to-fiber path can be considered to be a return path.

In the context of receiving elements, light propagating along the return path (e.g., from the waveguide to the fiber) is undesirable. The devices above rotate the plane of polarization of light following the return path, which can help reduce feedback effects. Specifically, if light is received with a first polarization state from the fiber, propagates from the fiber to the waveguide, reflects from the waveguide, and propagates back to the fiber, the returning light has a second polarization state orthogonal to the first polarization state. In addition, the device of FIGS. 11-13 further imparts a physical displacement to the return light, so that light returning toward the fiber is displaced away from the fiber.

It is also possible to use these devices as transmitting elements. For transmission, signals originate at the waveguide, rather than at the fiber. The signals propagate along an incident path from the waveguide to the fiber, with the intent of coupling into the fiber and exiting the device. Reflections from the fiber (e.g., from the waveguide, to the fiber, and back to the waveguide) are undesirable.

Figure 14:
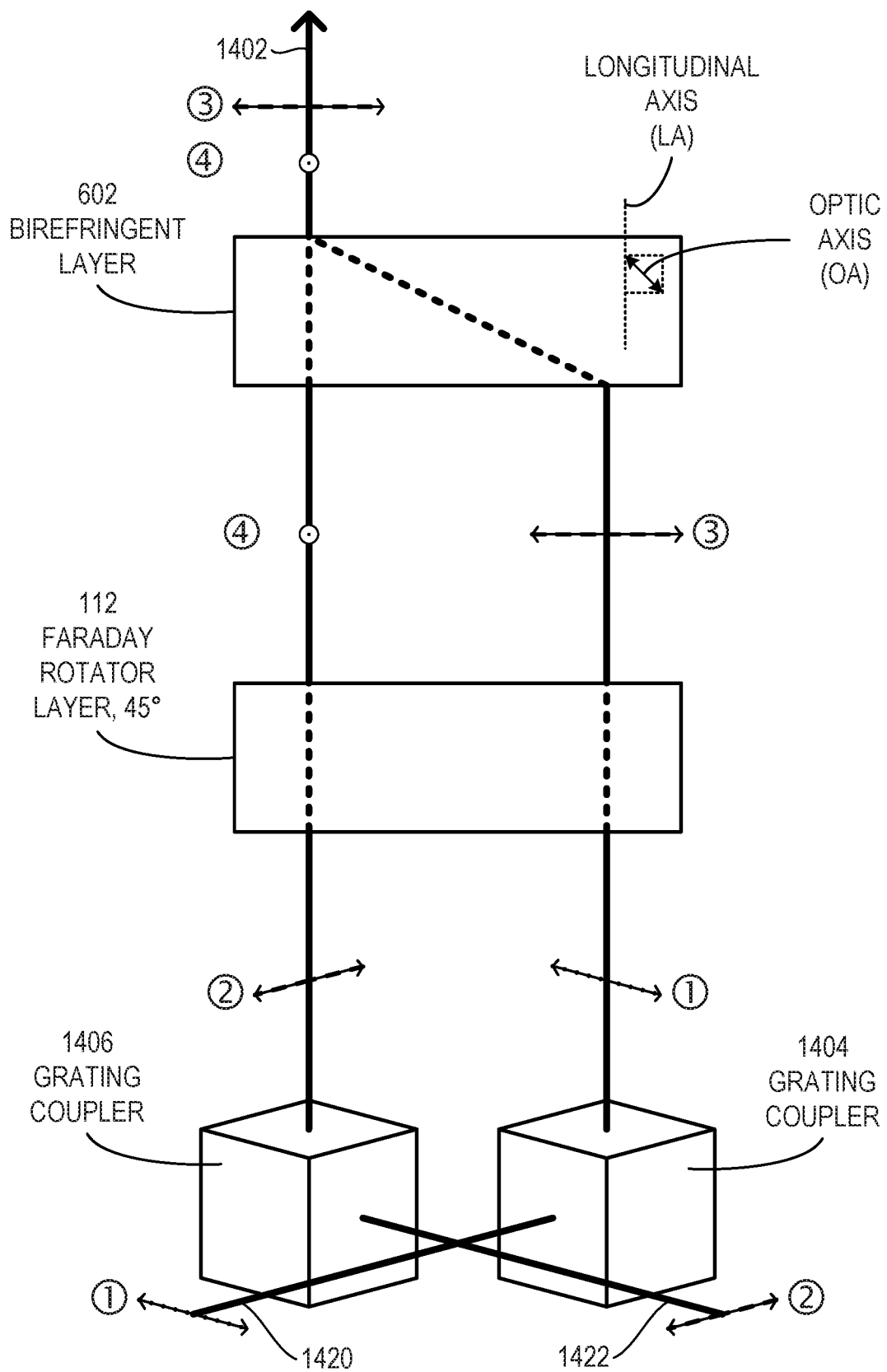
FIG. 14 shows an example of incident light propagating through the device of FIG. 11 when the device of FIG. 11 is configured as a transmission element, in accordance with some embodiments.
Figure 15:
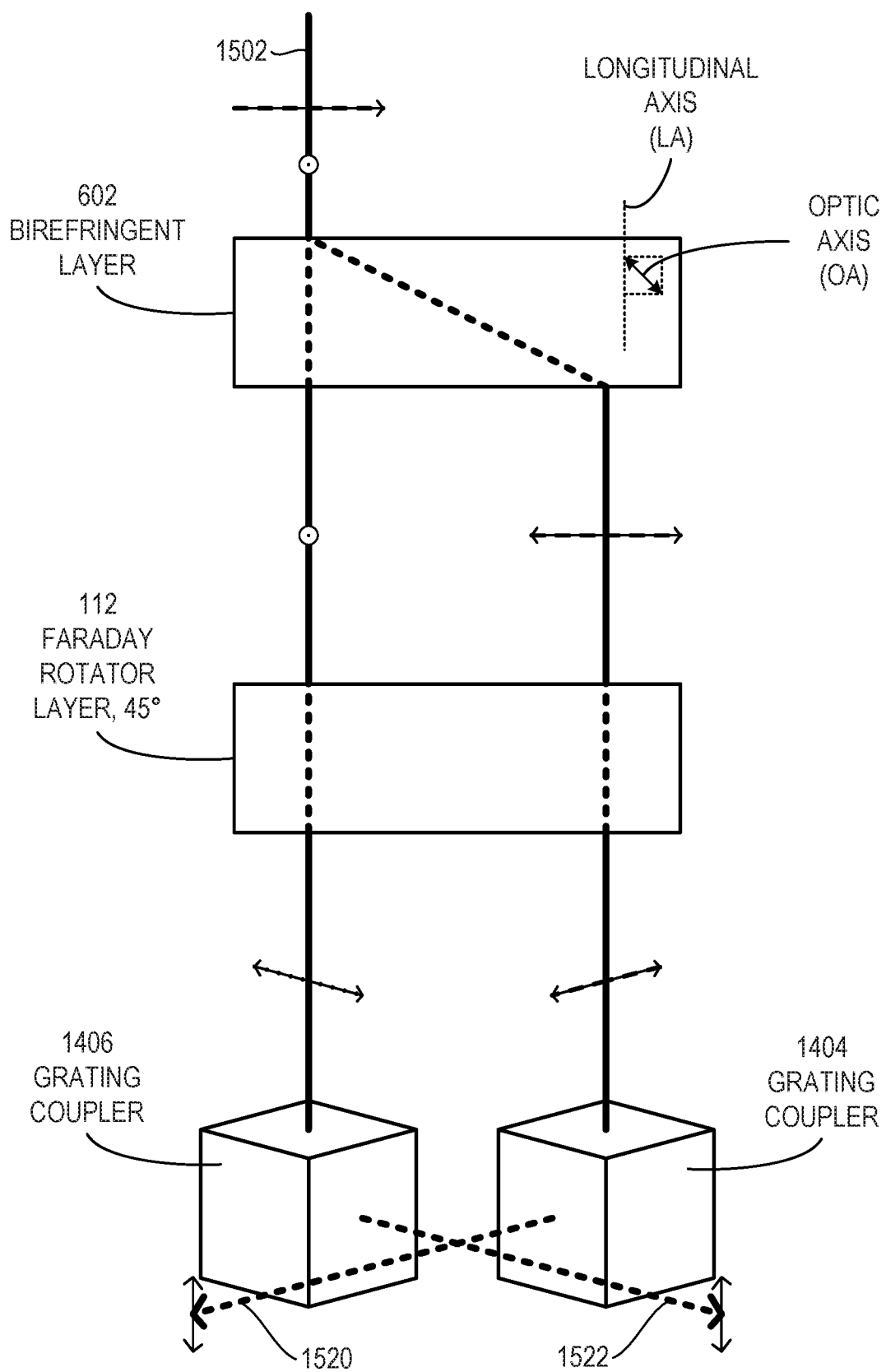
FIG. 15 shows an example of return light propagating through the device of FIG. 11 when the device of FIG. 11 is configured as a transmission element, in accordance with some embodiments.

It is possible to modify all of the devices shown above to function as transmission elements. For example, the device shown in FIG. 11 can be modified to function as a transmission element by changing the orientations of the two grating couplers. Specifically, each grating coupler can be pivoted by ninety degrees about an axis orthogonal to the plane of the redirection layer. FIGS. 14 and 15 trace beams through such a modified device.

FIG. 14 shows an example of incident light propagating through the device of FIG. 11 when the device of FIG. 11 is configured as a transmission element, in accordance with some embodiments.

In the geometry of the configuration of FIG. 14, a first light can be directed into the device by a first waveguide, and can propagate toward a first grating coupler 1404 along a first optical path 1420. The first light can have a polarization state orthogonal to a plane of incidence at the first grating coupler 1404, which is consistent with how the single-polarization grating couplers 604, 606 are used. Similarly, a second light can be directed into the device by a second waveguide, and can propagate toward a second grating coupler 1406 along a second optical path 1422. The second light can have a polarization state orthogonal to a plane of incidence at the second grating coupler 1406, which is also consistent with how the single-polarization grating couplers 604, 606 are used. The first and second grating couplers 1404, 1406 redirect the first and second light toward a Faraday rotator layer 112. The Faraday rotator layer 112 can rotate by forty-five degrees, with a first handedness, respective planes of polarization of the first and second lights to form respective third and fourth lights. The birefringent layer 602 can direct the third light as an extraordinary ray through the birefringent layer 602, and direct the fourth light as an ordinary ray through the birefringent layer 602. After passing through the birefringent layer 602, the third and fourth lights coincide at location 1402, and can both couple into a fiber.

FIG. 15 shows an example of return light propagating through the device of FIG. 11 when the device of FIG. 11 is configured as a transmission element, in accordance with some embodiments. The return light shown at location 1502 in FIG. 15 has returned from the fiber without the fiber modifying its polarization state.

Light that passes through the first grating coupler 1404 in the incident direction can return to the first grating coupler 1404 in the return direction, but returns with a polarization orientation orthogonal to the incident direction. Similarly, light that passes through the second grating coupler 1406 in the incident direction can return to the second grating coupler 1406 in the return direction, but returns with a polarization orientation orthogonal to the incident direction. In both of these cases, the light returns with a polarization orientation parallel to the plane of incidence at the first and second grating couplers 1404, 1406.

In general, it is difficult to design grating couplers to have high coupling efficiency for two different polarization states, as discussed above. The single-polarization grating couplers shown herein can be designed to have high coupling efficiency for just one polarization state, without concern for the orthogonal polarization state. The grating couplers 1404, 1406 can be designed to be single-polarization grating couplers, so that they have high coupling efficiency for light in the incident path. For the configuration of FIG. 15, it can be desirable to have a relatively low coupling efficiency for light polarization parallel to the plane of incidence at the grating couplers. Such a relatively low coupling efficiency can beneficially reduce the amount of light directed back to the waveguides along paths 1520 and 1522.

The configuration of FIGS. 14 and 15 can therefore achieve isolation through two mechanisms: rotating the polarization state of return light by ninety degrees, and reducing the intensity of the return light by using grating couplers having intentionally low coupling efficiencies for particular polarization states.

Figure 16:
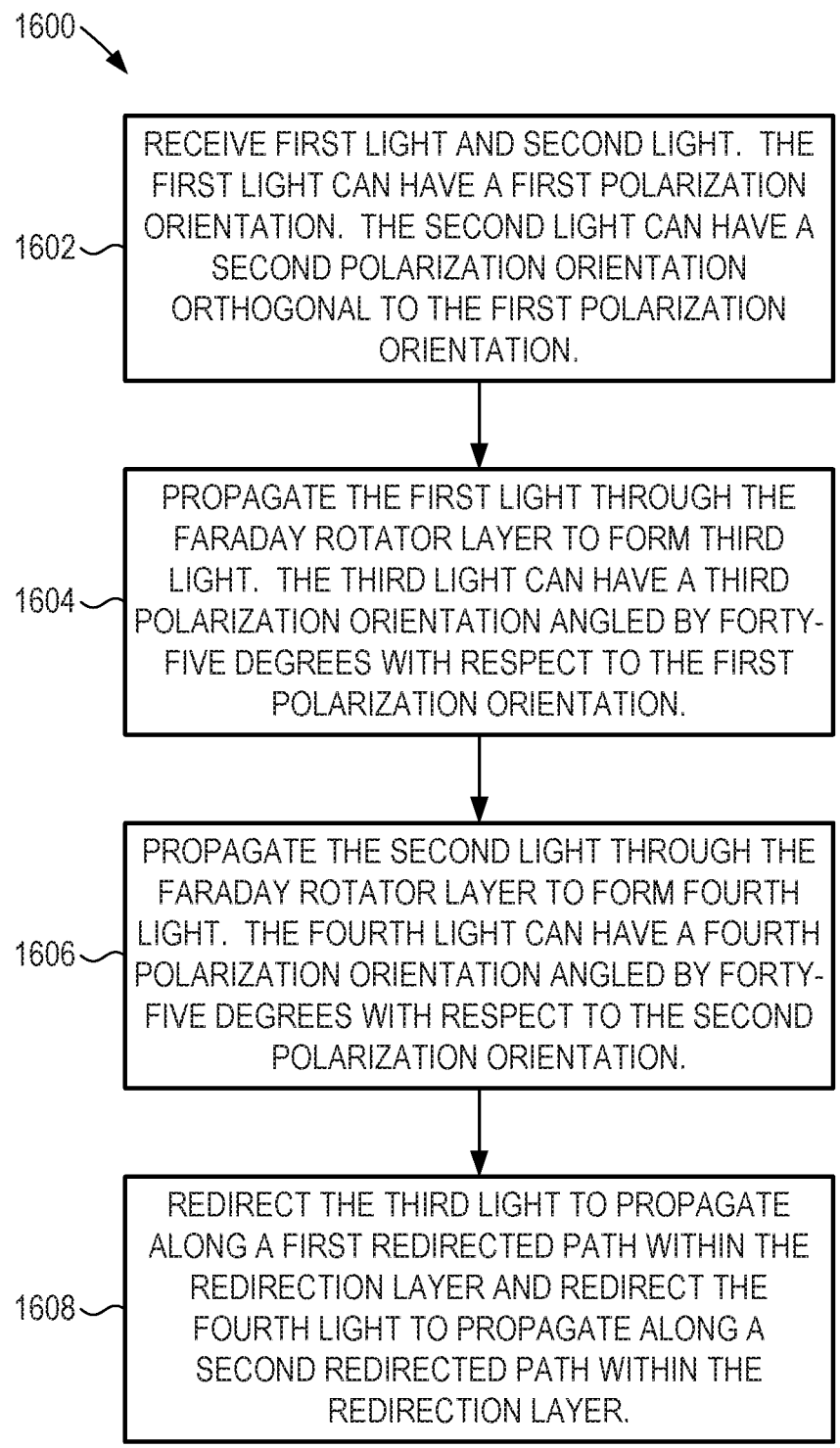
FIG. 16 shows an example of a method for coupling incident light from a fiber into waveguides, and reducing the coupling of return light from the waveguides into the fiber, in accordance with some embodiments.

FIG. 16 shows an example of a method 1600 for coupling incident light from a fiber into waveguides, and reducing the coupling of return light from the waveguides into the fiber, in accordance with some embodiments. In some examples, the method of FIG. 16 can be used for coupling a first beam having a first polarization orientation from an optical fiber along a first path into a first waveguide, coupling a second beam having a second polarization orthogonal to the first polarization from the optical fiber along a second path into a second waveguide, reducing the coupling of a third beam having the first polarization orientation from the first waveguide along the first path into the optical fiber, and reducing the coupling of a fourth beam having the second polarization orientation from the second waveguide along the second path into the optical fiber. Such a method can be executed by any of the devices shown in FIGS. 1-13 and discussed above. The method 1600 of FIG. 16 is but one example of such a method; other methods can also be used.

At operation 1602, a Faraday rotator layer can receive first light and second light. The first light can have a first polarization orientation. The second light can have a second polarization orientation orthogonal to the first polarization orientation.

At operation 1604, the Faraday rotator layer can propagate the first light through the Faraday rotator layer to form third light. The third light can have a third polarization orientation angled by forty-five degrees with respect to the first polarization orientation.

At operation 1606, the Faraday rotator layer can propagate the second light through the Faraday rotator layer to form fourth light. The fourth light can have a fourth polarization orientation angled by forty-five degrees with respect to the second polarization orientation.

At operation 1608, a planar redirection layer including at least one grating coupler can redirect the third light to propagate along a first redirected path within the redirection layer and redirect the fourth light to propagate along a second redirected path within the redirection layer. The second redirected path can be angled with respect to the first redirected path.

In some examples, such as the configuration shown in FIGS. 1-3, the first light and the second light can be coincident along a single optical path. The redirection layer can include a dual-polarization grating coupler. The dual-polarization grating coupler can redirect the third light to propagate along the first redirected path within the redirection layer and redirect the fourth light to propagate along the second redirected path within the redirection layer.

In some examples, such as the configuration shown in FIGS. 6-8, the first light and the second light can be coincident along a single optical path. A birefringent layer can be positioned between the Faraday rotator layer and the redirection layer. The birefringent layer can impart a spatial separation between the third light and the fourth light, such that the third light and the fourth light coincide upon exiting the Faraday rotator layer, the third light is angled with respect to the fourth light within the birefringent layer, and the third light and the fourth light are parallel and spatially separated between the birefringent layer and the redirection layer.

In some examples, such as the configuration shown in FIGS. 11-13, a birefringent layer can be positioned such that the Faraday rotator layer is positioned between the birefringent layer and the redirection layer. The birefringent layer can impart a spatial separation between the first light and the second light, such that the first light and the second light coincide before entering the birefringent layer, the first light is angled with respect to the second light within the birefringent layer, and the first light and the second light are parallel and spatially separated between the birefringent layer and the Faraday rotator layer.

To further illustrate the device and related method disclosed herein, a non-limiting list of examples is provided below. Each of the following non-limiting examples can stand on its own, or can be combined in any permutation or combination with any one or more of the other examples.

In Example 1, a device can include a Faraday rotator layer configured to: receive first light having a first polarization orientation, receive second light having a second polarization orientation orthogonal to the first polarization orientation, propagate the first light through the Faraday rotator layer to form third light, the third light having a third polarization orientation angled by forty-five degrees with respect to the first polarization orientation, and propagate the second light through the Faraday rotator layer to form fourth light, the fourth light having a fourth polarization orientation angled by forty-five degrees with respect to the second polarization orientation; and a planar redirection layer including at least one grating coupler, the redirection layer configured to redirect the third light to propagate along a first redirected path within the redirection layer and redirect the fourth light to propagate along a second redirected path within the redirection layer, the second redirected path being angled with respect to the first redirected path.

In Example 2, the device of Example 1 can optionally be configured such that the first redirected path is orthogonal to the second redirected path.

In Example 3, the device of any one of Examples 1-2 can optionally be configured such that on the first and second redirected paths, the redirected third light and the redirected fourth light have respective polarization orientations that are parallel to a plane of the redirection layer.

In Example 4, the device of any one of Examples 1-3 can optionally further include a focusing layer configured to: impart a convergence onto the first light such that the redirected third light is focused onto a longitudinal end of a first waveguide, and impart a convergence onto the second light such that the redirected fourth light is focused onto a longitudinal end of a second waveguide.

In Example 5, the device of any one of Examples 1-4 can optionally be configured such that the first light and the second light are coincident along a single optical path; and the redirection layer includes a dual-polarization grating coupler, the dual-polarization grating coupler configured to redirect the third light to propagate along the first redirected path within the redirection layer and redirect the fourth light to propagate along the second redirected path within the redirection layer.

In Example 6, the device of any one of Examples 1-5 can optionally be configured such that the dual-polarization grating coupler includes a region in which a refractive index varies periodically in two directions, a first of the two directions being orthogonal to the first redirected path, a second of the two directions being orthogonal to the second redirected path.

In Example 7, the device of any one of Examples 1-6 can optionally be configured such that the periodic variations in refractive index are curved in shape, with a curvature configured to: focus the redirected third light onto a longitudinal end of a first waveguide, and focus the redirected fourth light onto a longitudinal end of a second waveguide.

In Example 8, the device of any one of Examples 1-7 can optionally be configured such that the first light and the second light are coincident along a single optical path; and further including a birefringent layer positioned between the Faraday rotator layer and the redirection layer, the birefringent layer configured to impart a spatial separation between the third light and the fourth light, such that: the third light and the fourth light coincide upon exiting the Faraday rotator layer, the third light is angled with respect to the fourth light within the birefringent layer, and the third light and the fourth light are parallel and spatially separated between the birefringent layer and the redirection layer.

In Example 9, the device of any one of Examples 1-8 can optionally be configured such that the redirection layer includes two single-polarization grating couplers having a spatial separation that matches the spatial separation between the third light and the fourth light, a first of the two single-polarization grating couplers configured to redirect the third light to propagate along the first redirected path, a second of the two single-polarization grating couplers configured to redirect the fourth light to propagate along the second redirected path, the first of the two single-polarization grating couplers including a first region in which a refractive index varies periodically, the periodic variations of the first region being oriented orthogonal to the first redirected path, the second of the two single-polarization grating couplers including a second region in which a refractive index varies periodically, the periodic variations of the second region being oriented orthogonal to the second redirected path.

In Example 10, the device of any one of Examples 1-9 can optionally be configured such that in the first region, the periodic variations are curved in shape, with a curvature configured to focus the redirected third light onto a longitudinal end of a first waveguide, and in the second region, the periodic variations are curved in shape, with a curvature configured to focus the redirected fourth light onto a longitudinal end of a second waveguide.

In Example 11, the device of any one of Examples 1-10 can optionally be configured such that the first redirected path lies within a plane formed by an optic axis of the birefringent layer and a longitudinal axis that is orthogonal to a plane of the redirection layer; the second redirected path is orthogonal to the plane formed by the optic axis and the longitudinal axis; and on the first and second redirected paths, the redirected third light and the redirected fourth light have respective polarization orientations that are parallel to a plane of the redirection layer.

In Example 12, the device of any one of Examples 1-11 can optionally further include a birefringent layer positioned such that the Faraday rotator layer is positioned between the birefringent layer and the redirection layer, the birefringent layer configured to impart a spatial separation between the first light and the second light, such that: the first light and the second light coincide before entering the birefringent layer, the first light is angled with respect to the second light within the birefringent layer, and the first light and the second light are parallel and spatially separated between the birefringent layer and the Faraday rotator layer, wherein: the redirection layer includes two single-polarization grating couplers having a spatial separation that matches the spatial separation between the third light and the fourth light; a first of the two single-polarization grating couplers is configured to redirect the third light to propagate along the first redirected path; a second of the two single-polarization grating couplers is configured to redirect the fourth light to propagate along the second redirected path; the first of the two single-polarization grating couplers includes a first region in which a refractive index varies periodically, the periodic variations of the first region are oriented orthogonal to the first redirected path; the second of the two single-polarization grating couplers includes a second region in which a refractive index varies periodically, the periodic variations of the second region are oriented orthogonal to the second redirected path; the first redirected path is angled at forty-five degrees with respect to a plane formed by an optic axis of the birefringent layer and a longitudinal axis that is orthogonal to a plane of the redirection layer; the second redirected path is angled at forty-five degrees with respect to the plane formed by the optic axis of the birefringent layer and the longitudinal axis; and on the first and second redirected paths, the first and second beams have respective polarization orientations that are parallel to the plane of the redirection layer.

In Example 13, the device of any one of Examples 1-12 can optionally be configured such that in the first region, the periodic variations are curved in shape, with a curvature configured to focus the redirected third light onto a longitudinal end of a first waveguide, and in the second region, the periodic variations are curved in shape, with a curvature configured to focus the redirected fourth light onto a longitudinal end of a second waveguide.

In Example 14, a method can include receiving first light and second light at a Faraday rotator layer, the first light having a first polarization orientation, the second light having a second polarization orientation orthogonal to the first polarization orientation; propagating the first light through the Faraday rotator layer to form third light, the third light having a third polarization orientation angled by forty-five degrees with respect to the first polarization orientation; propagating the second light through the Faraday rotator layer to form fourth light, the fourth light having a fourth polarization orientation angled by forty-five degrees with respect to the second polarization orientation; and with a planar redirection layer including at least one grating coupler, redirecting the third light to propagate along a first redirected path within the redirection layer and redirecting the fourth light to propagate along a second redirected path within the redirection layer, the second redirected path being angled with respect to the first redirected path.

In Example 15, the method of Example 14 can optionally be configured such that the first light and the second light are coincident along a single optical path; wherein the redirection layer includes a dual-polarization grating coupler and further including with the dual-polarization grating coupler, redirecting the third light to propagate along the first redirected path within the redirection layer and redirecting the fourth light to propagate along the second redirected path within the redirection layer.

In Example 16, the method of any one of Examples 14-15 can optionally be configured such that the first light and the second light are coincident along a single optical path; and further comprising: with a birefringent layer positioned between the Faraday rotator layer and the redirection layer, imparting a spatial separation between the third light and the fourth light, such that: the third light and the fourth light coincide upon exiting the Faraday rotator layer, the third light is angled with respect to the fourth light within the birefringent layer, and the third light and the fourth light are parallel and spatially separated between the birefringent layer and the redirection layer.

In Example 17, the method of any one of Examples 14-16 can optionally further include with a birefringent layer positioned such that the Faraday rotator layer is positioned between the birefringent layer and the redirection layer, imparting a spatial separation between the first light and the second light, such that: the first light and the second light coincide before entering the birefringent layer, the first light is angled with respect to the second light within the birefringent layer, and the first light and the second light are parallel and spatially separated between the birefringent layer and the Faraday rotator layer.

In Example 18, a layered optical device can include a birefringent layer configured to receive light along a single optical path and spatially separate the received light into a first beam and a second beam, the first and second beams having polarization states that are orthogonal to each other; a Faraday rotator layer configured to: rotate a plane of polarization of the first beam by forty-five degrees to form a third beam, and rotate a plane of polarization of the second beam by forty-five degrees to form a fourth beam, the third and fourth beams having polarization states that are orthogonal to each other; and a planar redirection layer including: a first grating coupler configured to redirect the third beam to propagate along a first redirected path within the redirection layer; and a second grating coupler configured to redirect the fourth beam to propagate along a second redirected path within the redirection layer, the first and second redirected paths being orthogonal to each other.

In Example 19, the layered optical device of Example 18 can optionally be configured such that the first grating coupler is configured such that the third beam has a polarization state that is orthogonal to a plane formed by the third beam and the first redirected path; and the second grating coupler is configured such that the fourth beam has a polarization state that is orthogonal to a plane formed by the fourth beam and the second redirected path.

In Example 20, the layered optical device of any one of Examples 18-19 can optionally be configured such that the first grating coupler is configured such that the third beam has a polarization state that is parallel to a plane formed by the third beam and the first redirected path; and the second grating coupler is configured such that the fourth beam has a polarization state that is parallel to a plane formed by the fourth beam and the second redirected path.

What is claimed is:

1. A device, comprising:
a Faraday rotator layer configured to:
receive first light having a first polarization orientation,
receive second light having a second polarization orientation orthogonal to the first polarization orientation, the first light and the second light being coincident along a single optical path,
propagate the first light through the Faraday rotator layer to form third light, the third light having a third polarization orientation angled by forty-five degrees with respect to the first polarization orientation, and
propagate the second light through the Faraday rotator layer to form fourth light, the fourth light having a fourth polarization orientation angled by forty-five degrees with respect to the second polarization orientation; and
a planar redirection layer including a dual-polarization grating coupler, the planar redirection layer configured to redirect the third light to propagate along a first redirected path within the planar redirection layer and redirect the fourth light to propagate along a second redirected path within the planar redirection layer, the second redirected path being angled with respect to the first redirected path, the dual-polarization grating coupler including a region in which a refractive index varies periodically in two directions, a first of the two directions being orthogonal to the first redirected path, a second of the two directions being orthogonal to the second redirected path, the periodic variations in refractive index being curved in shape, with a curvature configured to focus the redirected third light onto a longitudinal end of a first waveguide, the curvature further configured to focus the redirected fourth light onto a longitudinal end of a second waveguide.

2. The device of claim 1, wherein the first redirected path is orthogonal to the second redirected path.

3. The device of claim 1, wherein on the first and second redirected paths, the redirected third light and the redirected fourth light have respective polarization orientations that are parallel to a plane of the planar redirection layer.

4. The device of claim 1, wherein the device further comprises a focusing layer, the Faraday rotator layer receiving the first light and the second light from the focusing layer.

5. A device comprising:
a Faraday rotator layer configured to:
receive first light having a first polarization orientation,
receive second light having a second polarization orientation orthogonal to the first polarization orientation, the first light and the second light being coincident along a single optical path,
propagate the first light through the Faraday rotator layer to form third light, the third light having a third polarization orientation angled by forty-five degrees with respect to the first polarization orientation, and
propagate the second light through the Faraday rotator layer to form fourth light, the fourth light having a fourth polarization orientation angled by forty-five degrees with respect to the second polarization orientation; and
a planar redirection layer including a dual-polarization grating coupler, the dual-polarization grating coupler configured to redirect the third light to propagate along a first redirected path within the redirection layer and redirect the fourth light to propagate along a second redirected path within the redirection layer, the second redirected path being angled with respect to the first redirected path, the dual-polarization grating coupler including a region in which a refractive index varies periodically in two directions, a first of the two directions being orthogonal to the first redirected path, a second of the two directions being orthogonal to the second redirected path, the periodic variations in refractive index being curved in shape, with a curvature configured to focus the redirected third light onto a longitudinal end of a first waveguide, the curvature further configured to focus the redirected fourth light onto a longitudinal end of a second waveguide.

6. The device of claim 5, wherein the device further comprises a focusing layer, the Faraday rotator layer receiving the first light and the second light from the focusing layer.

7. The device of claim 6, wherein the focusing layer comprises a lens, wherein the lens receives the first light and the second light from a fiber.

8. The device of claim 1,
wherein the first light and the second light are coincident along a single optical path; and
further comprising a birefringent layer positioned between the Faraday rotator layer and the redirection layer, the birefringent layer configured to impart a spatial separation between the third light and the fourth light, such that:

the third light and the fourth light coincide upon exiting the Faraday rotator layer, the third light is angled with respect to the fourth light within the birefringent layer, and the third light and the fourth light are parallel and spatially separated between the birefringent layer and the redirection layer.

9. The device of claim 8, wherein the redirection layer includes two single-polarization grating couplers having a spatial separation that matches the spatial separation between the third light and the fourth light, a first of the two single-polarization grating couplers configured to redirect the third light to propagate along the first redirected path, a second of the two single-polarization grating couplers configured to redirect the fourth light to propagate along the second redirected path, the first of the two single-polarization grating couplers including a first region in which a refractive index varies periodically, the periodic variations of the first region being oriented orthogonal to the first redirected path, the second of the two single-polarization grating couplers including a second region in which a refractive index varies periodically, the periodic variations of the second region being oriented orthogonal to the second redirected path.

10. The device of claim 9, wherein:

in the first region, the periodic variations are curved in shape, with a curvature configured to focus the redirected third light onto a longitudinal end of a first waveguide, and in the second region, the periodic variations are curved in shape, with a curvature configured to focus the redirected fourth light onto a longitudinal end of a second waveguide.

11. The device of claim 8, wherein:

the first redirected path lies within a plane formed by an optic axis of the birefringent layer and a longitudinal axis that is orthogonal to a plane of the redirection layer;

the second redirected path is orthogonal to the plane formed by the optic axis and the longitudinal axis; and on the first and second redirected paths, the redirected third light and the redirected fourth light have respective polarization orientations that are parallel to a plane of the redirection layer.

12. The device of claim 1, further comprising:

a birefringent layer positioned such that the Faraday rotator layer is positioned between the birefringent layer and the redirection layer, the birefringent layer configured to impart a spatial separation between the first light and the second light, such that:

the first light and the second light coincide before entering the birefringent layer, the first light is angled with respect to the second light within the birefringent layer, and the first light and the second light are parallel and spatially separated between the birefringent layer and the Faraday rotator layer, wherein:

the redirection layer includes two single-polarization grating couplers having a spatial separation that matches the spatial separation between the third light and the fourth light;

a first of the two single-polarization grating couplers is configured to redirect the third light to propagate along the first redirected path;

a second of the two single-polarization grating couplers is configured to redirect the fourth light to propagate along the second redirected path;

the first of the two single-polarization grating couplers includes a first region in which a refractive index varies periodically, the periodic variations of the first region are oriented orthogonal to the first redirected path;

the second of the two single-polarization grating couplers includes a second region in which a refractive index varies periodically, the periodic variations of the second region are oriented orthogonal to the second redirected path;

the first redirected path is angled at forty-five degrees with respect to a plane formed by an optic axis of the birefringent layer and a longitudinal axis that is orthogonal to a plane of the redirection layer;

the second redirected path is angled at forty-five degrees with respect to the plane formed by the optic axis of the birefringent layer and the longitudinal axis; and on the first and second redirected paths, the first and second beams have respective polarization orientations that are parallel to the plane of the redirection layer.

13. The device of claim 12, wherein:

in the first region, the periodic variations are curved in shape, with a curvature configured to focus the redirected third light onto a longitudinal end of a first waveguide, and in the second region, the periodic variations are curved in shape, with a curvature configured to focus the redirected fourth light onto a longitudinal end of a second waveguide.

14. A layered optical device, comprising:

a birefringent layer configured to receive light along a single optical path and spatially separate the received light into a first beam and a second beam, the first and second beams having polarization states that are orthogonal to each other;

a Faraday rotator layer configured to:

rotate a plane of polarization of the first beam by forty-five degrees to form a third beam, and rotate a plane of polarization of the second beam by forty-five degrees to form a fourth beam, the third and fourth beams having polarization states that are orthogonal to each other; and a planar redirection layer including dual-polarization grating coupler configured to redirect the third beam to propagate along a first redirected path within the planar redirection layer and redirect the fourth beam to propagate along a second redirected path within the planar redirection layer, the first and second redirected paths being parallel to the planar redirection layer and orthogonal to each other, the dual-polarization grating coupler including a region in which a refractive index varies periodically in two directions, a first of the two directions being orthogonal to the first redirected path, a second of the two directions being orthogonal to the second redirected path, the periodic variations in refractive index being curved in shape, with a curvature configured to focus the redirected third light onto a longitudinal end of a first waveguide, the curvature further configured to focus the redirected fourth light onto a longitudinal end of a second waveguide.

15. The layered optical device of claim 14, wherein:
the first grating coupler is configured such that the third beam has a polarization state that is orthogonal to a plane formed by the third beam and the first redirected path; and
the second grating coupler is configured such that the fourth beam has a polarization state that is orthogonal to a plane formed by the fourth beam and the second redirected path.

16. The layered optical device of claim 14, wherein:
the first grating coupler is configured such that the third beam has a polarization state that is parallel to a plane formed by the third beam and the first redirected path; and
the second grating coupler is configured such that the fourth beam has a polarization state that is parallel to a plane formed by the fourth beam and the second redirected path.

17. The device of claim 1, wherein the first and second redirected paths are parallel to the redirection layer.

18. The device of claim 5, wherein the first and second redirected paths are parallel to the redirection layer.

* * * * *